(12) United States Patent
Li et al.

(10) Patent No.: US 12,017,275 B2
(45) Date of Patent: Jun. 25, 2024

(54) ADDITIVE MANUFACTURING METHODS FOR COMPONENTS

(71) Applicant: Apple Inc., Cupertino, CA (US)

(72) Inventors: Hoishun Li, San Jose, CA (US); Brian M. Gable, San Jose, CA (US)

(73) Assignee: APPLE INC., Cupertino, CA (US)

( * ) Notice: Subject to any disclaimer, the term of this patent is extended or adjusted under 35 U.S.C. 154(b) by 52 days.

(21) Appl. No.: 17/445,556

(22) Filed: Aug. 20, 2021

(65) Prior Publication Data

US 2022/0055111 A1 Feb. 24, 2022

Related U.S. Application Data

(60) Provisional application No. 63/069,435, filed on Aug. 24, 2020.

(51) Int. Cl.
*B33Y 80/00* (2015.01)
*B22F 10/10* (2021.01)
*B32B 7/00* (2019.01)
*B32B 7/02* (2019.01)
*B33Y 10/00* (2015.01)

(52) U.S. Cl.
CPC ............... *B22F 10/10* (2021.01); *B32B 7/02* (2013.01); *B33Y 10/00* (2014.12); *B33Y 80/00* (2014.12)

(58) Field of Classification Search
CPC ........... B33Y 10/00; B33Y 80/00; B32B 7/00; B32B 7/02
See application file for complete search history.

(56) References Cited

U.S. PATENT DOCUMENTS

| | | | | |
|---|---|---|---|---|
| 9,975,182 | B2 * | 5/2018 | Stoyanov | ................ B23B 51/02 |
| 2017/0297111 | A1 * | 10/2017 | Myerberg | ............... B28B 1/001 |
| 2019/0299290 | A1 * | 10/2019 | Kuhns | ........................ B22F 3/11 |
| 2020/0245487 | A1 | 7/2020 | Counts et al. | |

FOREIGN PATENT DOCUMENTS

| | | |
|---|---|---|
| CN | 101166597 A | 4/2008 |
| CN | 201399294 Y | 2/2010 |
| CN | 105960116 A | 9/2016 |
| CN | 106163704 A | 11/2016 |
| CN | 106457399 A | 2/2017 |
| CN | 206393805 U | 8/2017 |
| CN | 108883994 A | 11/2018 |
| CN | 109388187 A | 2/2019 |
| CN | 110125407 A | 8/2019 |
| CN | 110933202 A | 3/2020 |
| CN | 111347046 A | 6/2020 |

* cited by examiner

*Primary Examiner* — Adam Krupicka
(74) *Attorney, Agent, or Firm* — Dorsey & Whitney LLP

(57) ABSTRACT

A method of forming a unitary sintered body can include cutting a first portion and a second portion from a sheet of feedstock. The feedstock can include ceramic or metallic particles suspended in a binder. The first portion can be positioned in contact with the second portion and the portions can be sintered together to form the unitary body.

14 Claims, 21 Drawing Sheets

ADDITIVE MANUFACTURING METHODS FOR COMPONENTS

CROSS-REFERENCE TO RELATED APPLICATION(S)

This claims priority to U.S. Provisional Patent Application No. 63/069,435, filed 24 Aug. 2020, and entitled "ADDITIVE MANUFACTURING METHODS FOR COMPONENTS," the entire disclosure of which is hereby incorporated by reference.

FIELD

The described embodiments relate generally to electronic device components formed using additive manufacturing processes. More particularly, the present examples relate to layered metal components.

BACKGROUND

Electronic devices are widespread in society and can take a variety of forms, from wristwatches to computers. Electronic devices, including portable electronic devices such as handheld phones, tablet computers, and watches generally include a type of housing or enclosure to house the internal components.

The manufacturing of such enclosures or housings, can benefit from increased output, reduced material waste, and reduced machining requirements. Thus, it can be desirable to produce a device enclosure using additive manufacturing processes to reduce material waste and machining costs and increase output.

Further, such enclosures or housings can benefit from a combination of multiple materials that form the component. The combination of multiple materials in complex design configurations can introduce complications into traditional manufacturing processes. For example, device enclosures formed of multiple materials can require increased processing time, material, and cost when manufactured using traditional techniques. In some examples, common manufacturing processes may not be able to produce a device enclosure with a desired combination of properties. Accordingly, it can be desirable to provide processing and manufacturing techniques that allow for efficient, low cost, and low waste production of device enclosures having a desired combination of differing properties.

SUMMARY

According to some aspects of the present disclosure, a unitary body can include a sintered metal that defines an enclosed cavity having a volume of between about 1 cm³ to about 10,000 cm³.

In some examples, the sintered metal includes a first layer bonded to a second layer at an interface including a striated microstructure. The first layer includes an outer portion and an inner portion, the outer portion having a higher density than the inner portion. The sintered metal includes a first region having a first density and a second region having a second density different from the first density. The unitary body can further include a residual binder, the unitary body including between about 0.001% and about 70% residual binder by weight. The sintered metal includes a sidewall and a floor that define the enclosed cavity, the sidewalls having an angle relative to the floor of greater than about 20°. The sintered metal includes at least one of aluminum, steel, or titanium.

According to some aspects, a method of forming a unitary body can include removing at least one of a first portion and a second portion from a feedstock including particles suspended in a binder, positioning the first portion in contact with the second portion, and sintering the first portion and the second portion to form the unitary body.

In some examples, the method can further include positioning a third portion in contact with the second portion, the third portion cut from the feedstock and defining an aperture. In other examples, the method can include positioning a third portion that includes a second material in contact with the first portion such that the first portion is disposed between the second portion and the third portion. The first portion can include an adherent between the second portion and the third portion prior to sintering. The unitary body defines an enclosed cavity. The first portion includes first particles and the second portion includes second particles, the first particles including a different material than the second particles. The method can further include positioning a component in a volume defined by the unitary body. The feedstock includes between about 0% and about 70% of the binder by weight. Removing at least one of the first portion and the second portion from the feedstock can include laser cutting at least one of the first portion and the second portion from the feedstock. Laser cutting at least one of the first portion and the second portion from the feedstock can include cutting at least one of the first portion and the second portion in a desired shape with a dimensional tolerance of less than about 10 microns. Sintering the first portion and the second portion to form the unitary body can include heating the first portion and the second portion to a temperature of at least about 500° C. The method can further include debinding the first portion and the second portion.

According to some aspects, a metallic part can include a unitary sintered body having a density greater than about 95%, the unitary sintered body including a first layer fused to a second layer along a planar interface region including a striated microstructure. In some examples, the unitary sintered body includes steel. The unitary sintered body includes a first metal and a second metal different from the first metal.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
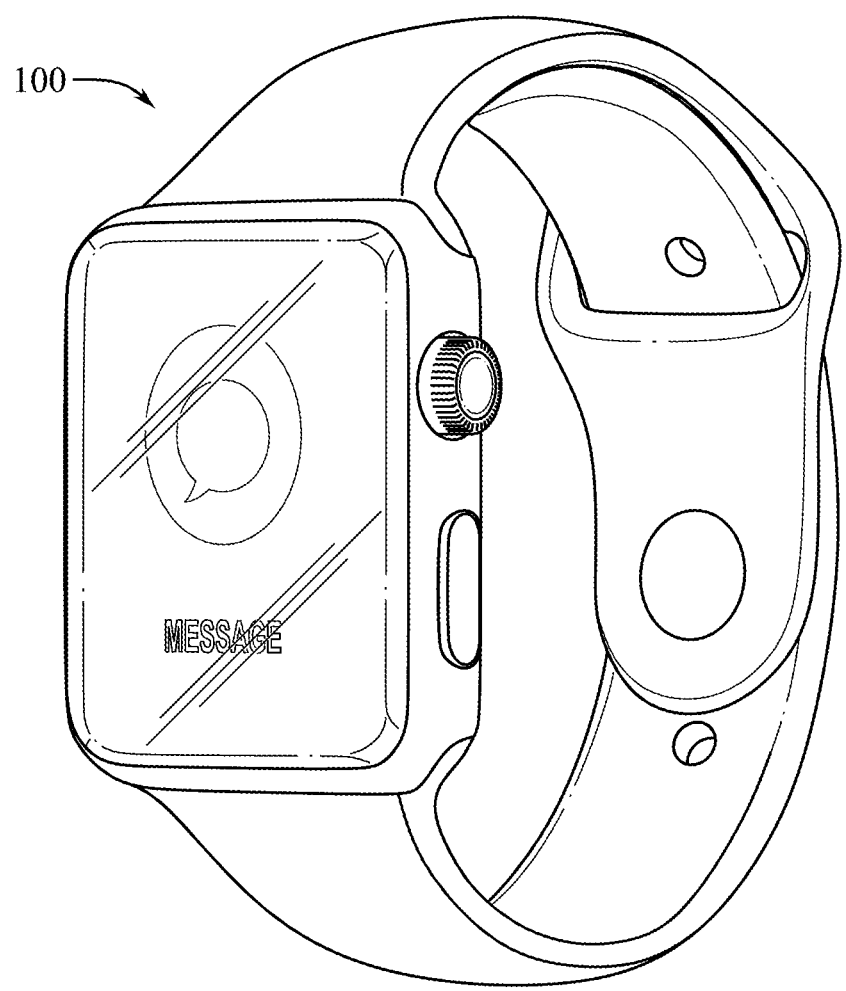
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

One aspect of the present disclosure relates to a method for forming unitary sintered parts, such as unitary sintered metallic parts for electronic devices. A method for forming a metallic part, such as a housing component for an electronic device, can include forming a feedstock material including a polymer binder and metallic particles. Multiple pieces or portions can be removed from the feedstock material by laser cutting or stamping. The pieces can be removed in a desired shape, for example, a shape corresponding to a cross-sectional layer of the part to be formed, with high dimensional precision. The pieces can be assembled in a desired arrangement Additive manufacturing, also referred to as 3D printing, can be refer to processes to form 3-dimensional components by depositing material over a substrate or other portion of material. The materials used in additive manufacturing processes can include metals, plastics, ceramics, and composite materials. Conventional techniques for 3D printing can involve selectively depositing or printing a mixture of a binder material and a powder onto a substrate or a platform. This green part can then be drawn or built up, layer by layer, into a desired shape, after which the binder can be burned off and the powder can be sintered or fused together.

Conventional 3D printing techniques that rely on a print head to draw layers of material can form a wide variety of shapes and geometries, but can also be limited in certain aspects. For example, relatively large unsupported spans can be difficult or impossible to produce because many of the drawn layers are unsupported until the complete structure has been drawn, leading them to collapse under their own weight. Examples of such geometries include bridge structures or hollow box structures. As used herein, the term hollow box can refer to any geometry that has a cavity or defines a volume that is completely enclosed by material without supports disposed within the cavity or volume.

In contrast, the additive manufacturing processes described herein can produce substantially any geometry or structure as desired, including structures having relatively large unsupported spans and/or fully enclosed cavities or volumes. By removing portions of material from a block or sheet of feedstock including a binder and a powder, and positioning the portions adjacent one another to form a part, these typically difficult to print structures can easily be formed. This can be because each layer of material can be removed from the feedstock as a single self-supporting piece and then positioned at a desired location on the part, rather than being formed, in a non-self-supporting manner at the desired location. While some conventional techniques, such as binder jet 3D printing, can produce relatively large unsupported spas having a bridge geometry, these techniques are typically incapable of also producing an enclosed hollow box geometry.

The additive manufacturing processes described herein can also produce components and parts that have highly precise shapes, with resolutions in the range of several microns. Whereas conventional 3D printing techniques can be dimensionally limited by the size of the print head and the stream of binder and powder being deposited, the processes described herein can include high-precisions techniques such as stamping or laser-cutting to form portions from a feedstock. The ability to form entire layers or portions from a feedstock can also result in a reduction in manufacturing time, because there is no need for a print head to traverse the entire area of each layer of a part. Additionally, the additive manufacturing processes described herein can produce parts and components that include multiple materials and/or multiple densities or forms of a single material because different feedstocks can be used to form various portions of the part as desired.

These and other embodiments are discussed below with reference to FIGS. 1-9E. However, those skilled in the art will readily appreciate that the detailed description given herein with respect to these Figures is for explanatory purposes only and should not be construed as limiting.

FIG. 1 shows an example of an electronic device 100. The electronic device shown in FIG. 1 is a watch, such as a smartwatch. The smartwatch of FIG. 1 is merely one representative example of a device that can be used in conjunction with the components and methods disclosed herein. The electronic device 100 can correspond to any form of a wearable electronic device, a portable media player, a media storage device, a portable digital assistant ("PDA"), a tablet computer, a computer, a mobile communication device, a GPS unit, a remote control device, and the like. The electronic device 100 can be referred to as an electronic device, a device, or a consumer device. Further details of the electronic device 100 are provided below with reference to FIGS. 2 and 3A.

Figure 2:
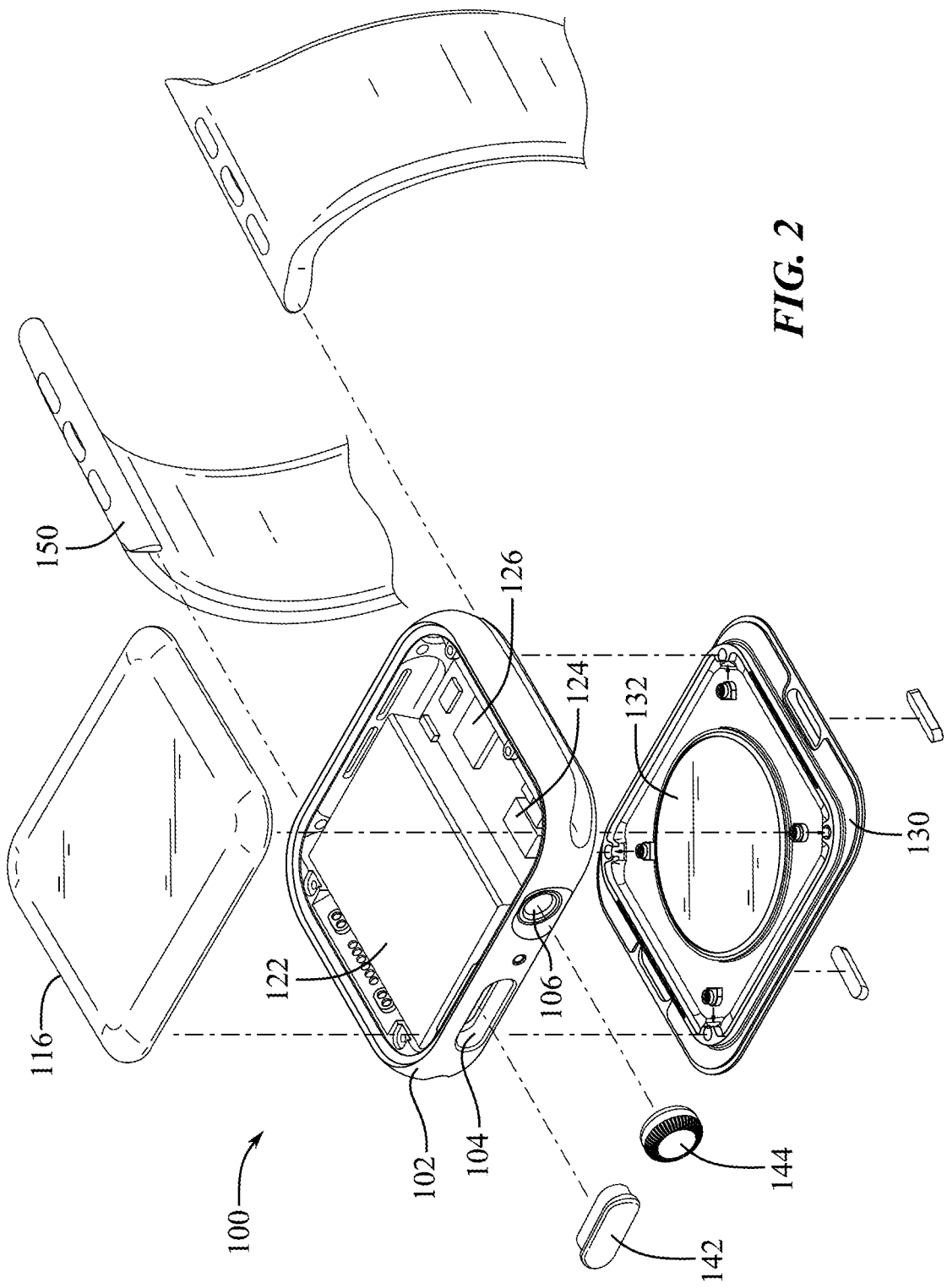
FIG. 2 shows an exploded view of the electronic device of FIG. 1.

Referring now to FIG. 2, the electronic device 100 includes a main housing or enclosure 102. The housing or enclosure 102 can be connected to a front cover 116 and can have a strap 150 attached thereto. A number of input elements, such as a rotatable crown 144 and/or a button 142 can be attached to and protrude from the housing 102. The housing 102 can substantially define at least a portion of an exterior surface of the device 100. The cover 116 can include glass, plastic, ceramic, or any other substantially transparent material, component, or assembly. The cover 116 can cover or otherwise overlay a display, a camera, a touch sensitive surface, such as a touchscreen, or other component of the device 100. The cover 116 can define a front exterior surface of the device 100. A back cover 130 can also be attached to the housing 102, for example, opposite the cover 116. The back cover 130 can include ceramic, plastic, metal, or combinations thereof. In some examples, the back cover 130 can include an electromagnetically transparent portion 132. The electromagnetically transparent portion 132 can be transparent to any wavelength of electromagnetic radiation, such as visual light, infrared light, radio waves, or combinations thereof. Together, the housing 102, cover 116, and back cover 130 can substantially define an interior volume and exterior surface of the device 100. In some examples, the housing 102 defines at least a portion of the back cover 130, such that the back cover 130 and housing 102 are integrally formed. The housing 102 can be formed from a metallic material. As discussed in greater detail below, the housing 102 can be formed using an additive manufacturing process, such as direct metal deposition. In some examples, the housing 102 can also include a surface layer formed by a physical vapor deposition process.

The housing 102 can be a substantially continuous or unitary component and can include one or more openings 104, 106 to receive components, such as components 142 and 144 of the electronic device 100 and/or provide access to an internal portion of the electronic device 100. Additionally, other components of the electronic device 100, can be formed from or can include a metallic or ceramic material formed using the methods and techniques described herein.

The device 100 can also include internal components, such as a haptic engine 124, a battery 122, and a system in package (SiP), including one or more integrated circuits 126, such as processors, sensors, and memory. The SiP can also include a package. All or a portion of one or more internal components can be contained within the internal volume defined by the housing 102.

The internal components, such as one or more of components 122, 124, 126 can be disposed within an internal volume defined at least partially by the housing 102, and can be affixed to the housing 102 via internal surfaces, attachment features, threaded connectors, studs, posts, or other features, that are formed into, defined by, or otherwise part of the housing 102 and/or the cover 116 or back cover 130. In some examples, the attachment features can be formed relatively easily on interior surfaces of the housing 102, for example, by machining. In some examples, the attachment features can be formed during the additive manufacturing process, as described herein.

The housing 102 formed from a metallic material can be conformable to interior dimensional requirements, as defined by the internal components 122, 124, 126. For example, the structure of the housing 102 can be defined or limited exclusively or primarily by the internal components the housing 102 is designed to accommodate. That is, the housing 102 can be shaped to house the interior components 122, 124, 126 in a dimensionally efficient manner without being constrained by factors other than the dimensions of the components, such as conventional manufacturing limitations.

Any number or variety of parts or components, for example, components of an electronic device, can be formed from according to the processes described herein and can include the structures as described herein. The structure and materials of the parts and components, as well as the components themselves, can apply not only to the specific examples discussed herein, but to any number or variety of examples in any combination. Various examples of components formed by the additive manufacturing processes described herein are described below with reference to FIGS. 3A-3D.

Figure 3A:
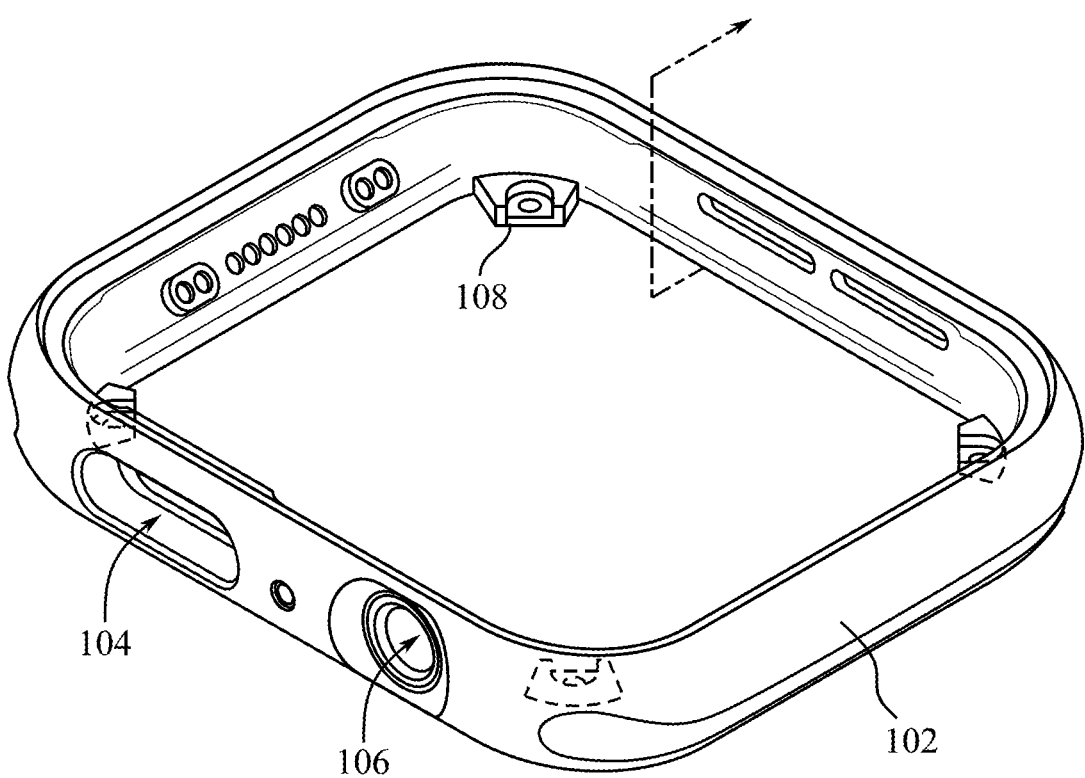
FIG. 3A shows a perspective view of a housing component of the electronic device of FIG. 1.

Referring now to FIG. 3A, a perspective view of the housing 102 of the electronic device 100 is shown. The housing 102 can include a metal or ceramic structure that is partially or entirely formed using the additive manufacturing processes described herein. The illustration of FIG. 3A can be representative of the shape and design of the structure immediately after formation using the processes described herein, or can represent a finalized housing that has undergone additional processing, such as machining.

The housing 102 can also include features, such as speaker ports, button apertures, or charging ports apertures. As shown, apertures 104, 106, can be integrally formed in the housing 102. In some examples, protruding features 108 can also be integrally formed in the housing 102 by the processes described herein. The features 108 can be support structures that can engage with fasteners or other components when assembling the electronic device while features 104 and 106 can be configured to receive buttons or inputs of the electronic device. As discussed in greater detail below, the housing 102 can be formed or machined to define the features.

Figure 3B:
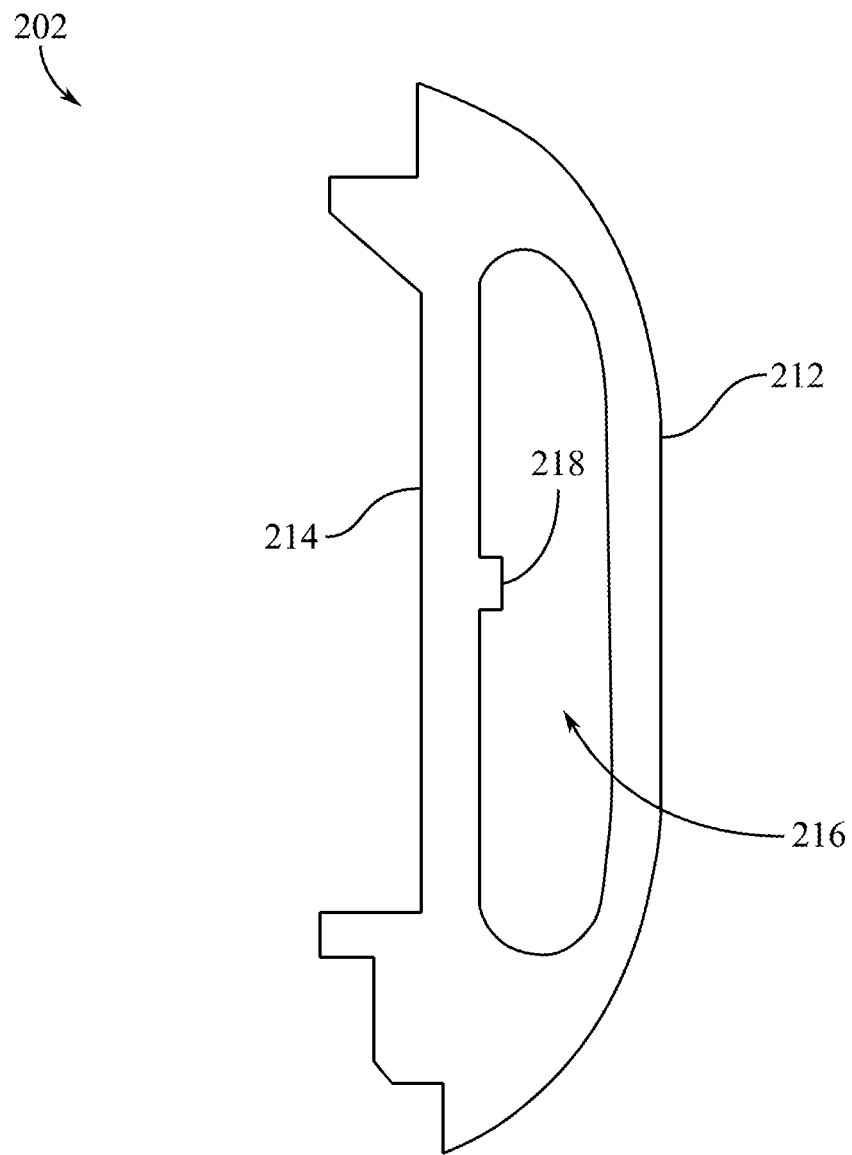
FIG. 3B shows a cross-sectional view of the housing component of FIG. 3A.

FIG. 3B shows a cross-sectional view of a housing component 202 that can be substantially similar to, and include some or all of the features of the housing 102 shown in FIG. 3A. The housing 202 can be formed by an additive manufacturing process as described herein and, as can be see, can have a hollow box geometry, including a cavity or volume 216 that is defined by at least an outer wall 212 and an inner wall 214. In some examples, the outer wall 212 can also at least partially define the exterior surface of the housing 202 and an associated electronic device, while the inner wall 214 can at least partially define an internal volume of the electronic device. In some examples, one or more features 218 can be formed within the cavity 216 as desired. These features 218 can be attachment or support features for other components, can provide thermal management to the device, or can have any function or geometry as desired.

Additionally, in some examples, the geometry of the housing 202 defining a cavity 216 including a feature 218 therein may not be able to be achieved by conventional manufacturing processes. In some examples, and as described further herein, the cavity 216 can be formed by forming a green part according to the processes described herein that includes portions of binder material that do not include any powder at the location of the cavity 216. When the green part is then subjected to debinding and/or sintering, as described herein, substantially no binder or other material will remain in the cavity while the powder is sintered or fused to form the sidewalls 212, 214.

Figure 3C:
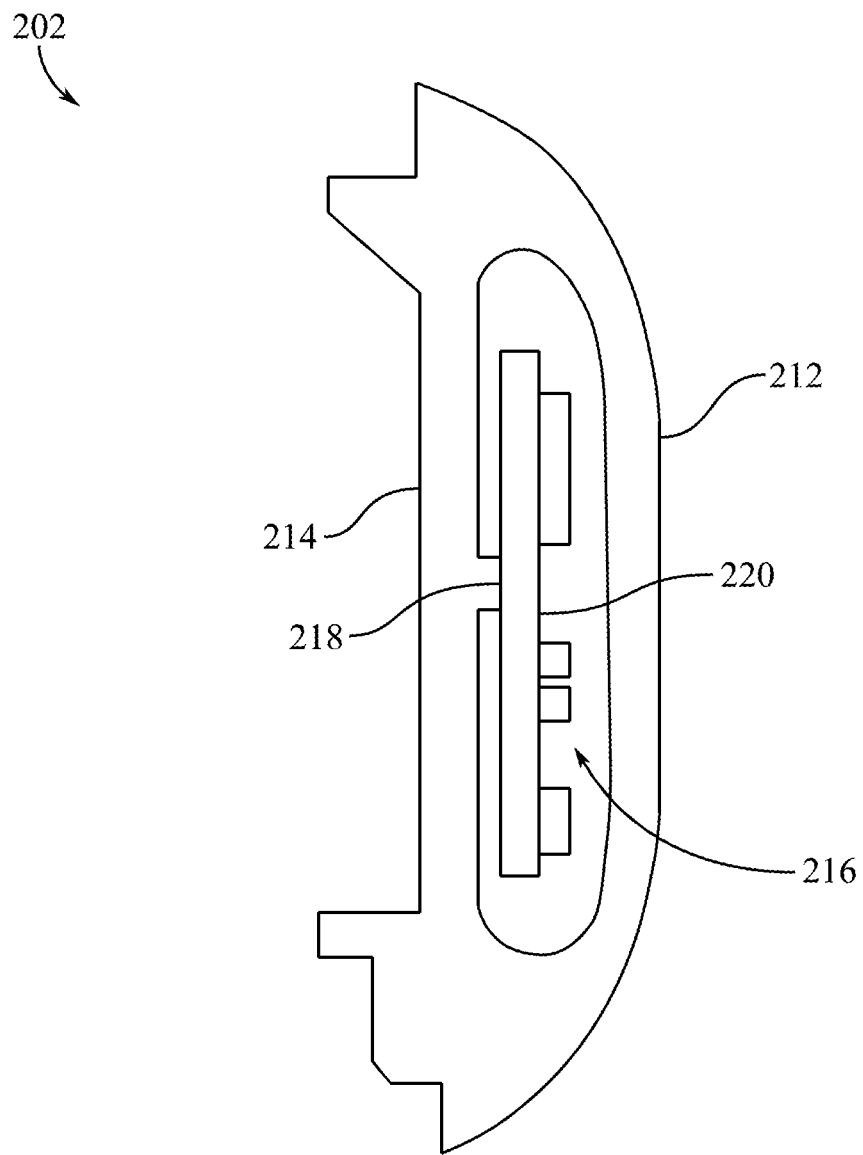
FIG. 3C shows cross-sectional view of the housing component of FIG. 3A including an operational component.

FIG. 3C shows cross-sectional view of the housing component 202 shown in FIG. 3B including an operational component 220 disposed in the cavity 216 and affixed to the feature 218. The operational component 220 can be affixed to the feature 218 by any technique as desired, such as an adhesive, fixture, and/or mechanical interlock. The operational component 220 can include any type or combination of computing component, digital component, or mechanical component as desired. For example, the operational component 220 can include one or more sensors or an inductive charging component. By providing a space for the positioning of the component 220 within the housing 202 itself, the geometry of the housing 202 defining the cavity 216 can allow for a device to include additional components or functionalities without the need to take up space within the internal volume of the device itself. This configuration can thereby allow for reduced device sizes and/or increased levels of performance or functionality. Further, in the example of an inductive charging component 220, the position of the component 220 near the exterior surface defined by the outer wall 212 can further allow for increased performance.

In some examples, the housing 202 can define an aperture or opening in communication with the cavity 216 to allow the insertion or positioning of the operational component 220 at a desired location. In some examples, such as when the component 220 includes a structural or mechanical component, the housing 202 or portions thereof can be formed around the component 220 by the processes described herein. Further details regarding the structure of components formed according to the processes described herein are discussed with respect to FIG. 3D.

Figure 3D:
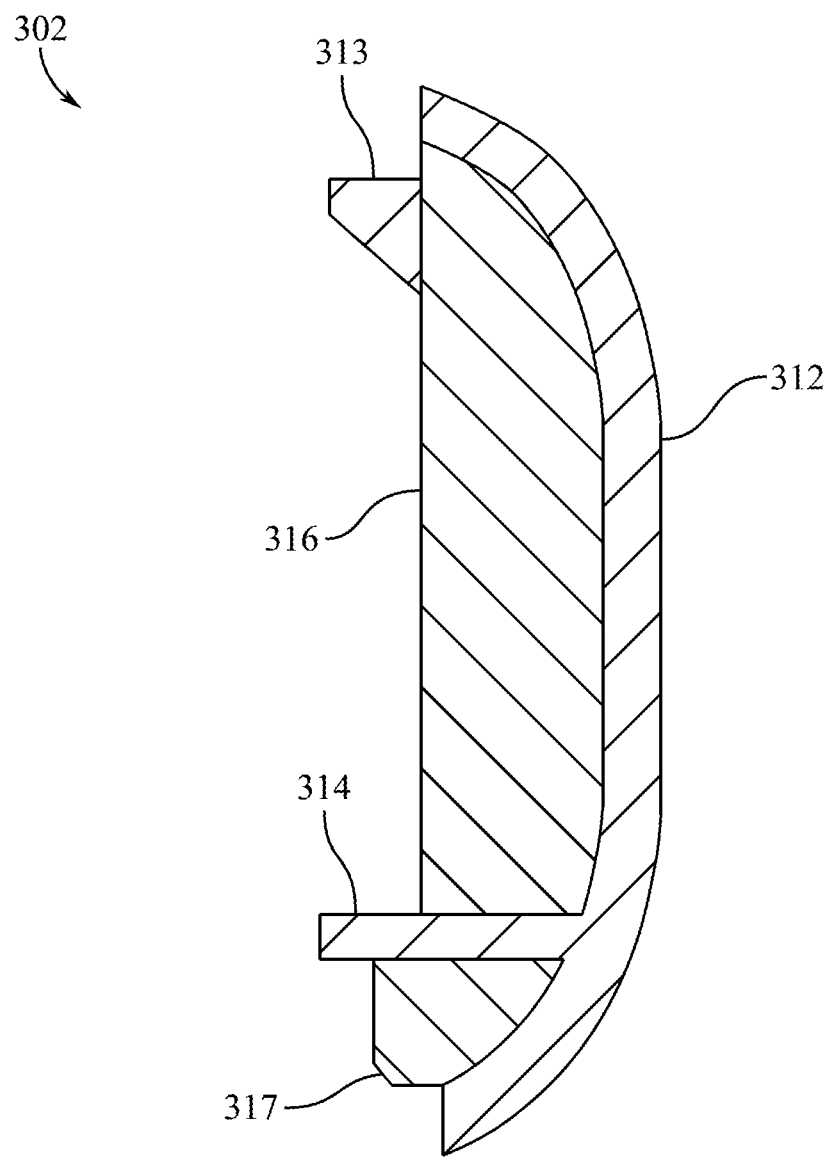
FIG. 3D shows a cross-sectional view of a housing component of an electronic device.

FIG. 3D shows a cross-sectional view of a housing 302 that can be substantially similar to, and include some or all of the features of the housing 102 shown in FIG. 3A. The housing 302 can include a unitary body or part, but as shown, the housing 302 can include multiple different materials, such as multiple different metals and/or ceramics. For example, the housing 302 can include one or more exterior portions 312 that are fused or bonded to one or more interior portions 316, 317. In some examples the exterior portion 312 can include a first metal, such as steel, while the interior portions 316, 317 can include a second, different metal, such as aluminum.

The ability to select different materials to form various portions of a component, such as the housing 302, can allow for advantageous combinations of the properties of several materials. For example, configurations where the exterior portion 312 includes steel and the interior portions 316, 317 include aluminum can allow for a housing 302 that has a relatively hard and durable exterior surface material, while having a relatively lightweight and easily machinable interior surface.

In some examples, both the exterior portion 312 and the interior portions 316, 317 can be formed as a unitary body according to the processes described herein. In some examples, however, one or more of the exterior portion 312 and/or interior portions 316, 317 can be pre-formed by another process and the other of the portions can be formed and fused to the pre-formed portion according to the processes described herein.

The housing 302 is not limited to having a two-part construction, however, and different portions including different materials can have any geometry or arrangement as desired. For example, the housing 302 can include a feature 313 that can be formed according to the processes described herein and fused or bonded to the portion 316, which can be pre-formed or formed concurrently with the feature 313. The feature 313 can include a different material than the portion 316 to which it is fused. In some examples, the feature can be an attachment feature or support feature for components that are positioned in the internal volume defined by the housing 302.

Additionally, or alternatively, the exterior portion 312 can include a protrusion 314 that can extend into or through the interior portions 316, 317. The protrusion 314 can be a support feature, attachment feature, or any other feature as desired. For example, the protrusion 314 can allow for controlled thermal communication between the exterior portion 312 and the internal volume of the housing 302. Although a specific configuration is illustrated in FIG. 3D, it will be understood that a component such as housing 302 can include any number of portions formed from any number of materials in any shape, size, and configuration.

Further, in some examples, the various portions of the housing 302 can include the same material, but can have different densities. For example, the exterior portion 312 can include a material, such as a metal or ceramic material, having a first density, while the interior portions 316, 317 can include the same material having a second, different density. In some examples, the exterior portion 312 can have substantially any density described herein, such as a density of at least about 99%. In some examples, the interior portion 316, 317 can also have substantially any density described herein, such as a density of less than about 80%. In some examples, the interior portions 316, 317 can be considered a foam. Further, in some examples, the density of any of the portions of the housing 302 can vary across one or more dimensions of the portion. That is, any of the portions of the housing 302 can have a variable density at one or more regions, a stepped density between two or more regions, and/or a density gradient between two or more regions. In some examples, and as described further herein, the density of a component or part formed according to the processes described herein can be controlled by controlling the binder loading percentage of the feedstock used to form that portion of the component or part.

As used herein, the terms exterior, outer, interior, inner, front, rear, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Any number or variety of parts or components, for example, components of an electronic device, can be formed from according to the processes described herein and can include the structures as described herein. The structure and materials of the parts and components, as well as the components themselves, can apply not only to the specific examples discussed herein, but to any number or variety of examples in any combination. Various examples of components formed by the additive manufacturing processes described herein are described below with reference to FIGS. 4-6.

Figure 4:
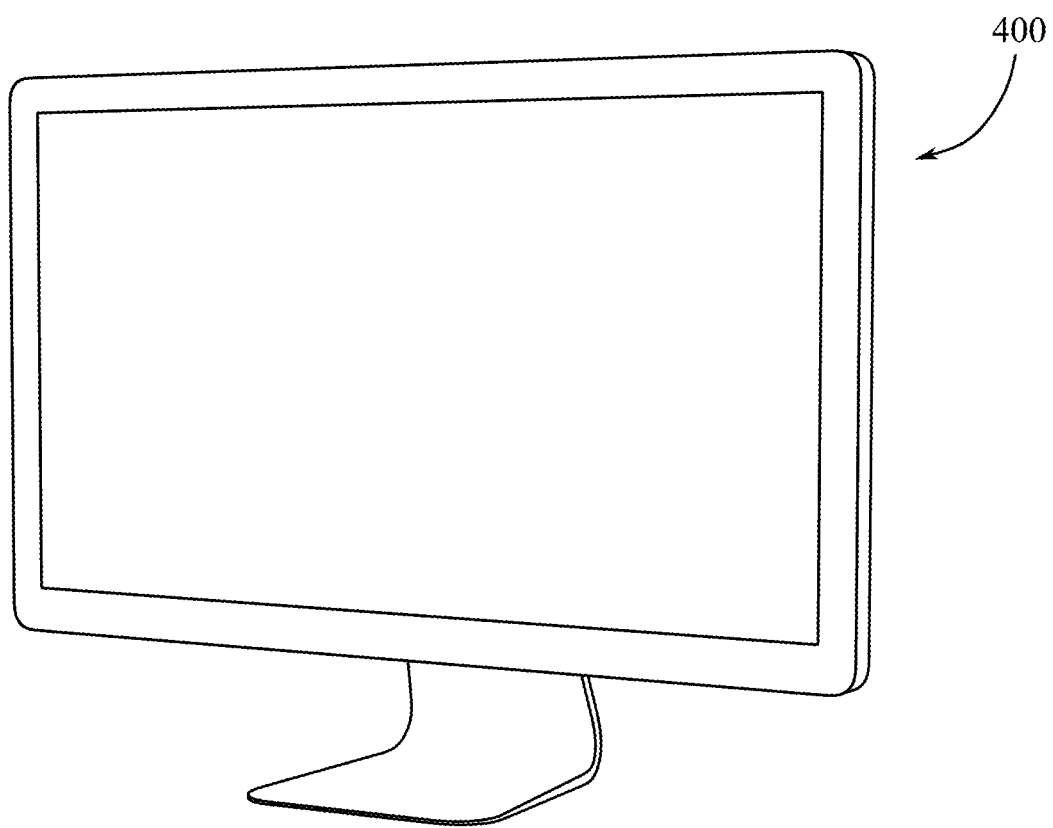
FIG. 4 shows a perspective view of an electronic device.

FIG. 4 shows an example electronic device 400 that can have a housing or other components including the structures and formed according to the processes described herein. The electronic device 100 shown in FIG. 4 is a display or monitor, for example, as used with a computer. This is, however, merely one representative example of a device that can be used in conjunction with the ideas disclosed herein. The electronic device 400 can, for example, correspond to a portable media player, a media storage device, a portable digital assistant ("PDA"), a tablet computer, a computer, a mobile communication device, a GPS unit, a remote-control device, and the like. The electronic device 400 can be referred to as an electronic device, or a consumer device. Further details of the electronic device 400 are illustrated in FIG. 5.

Figure 5:
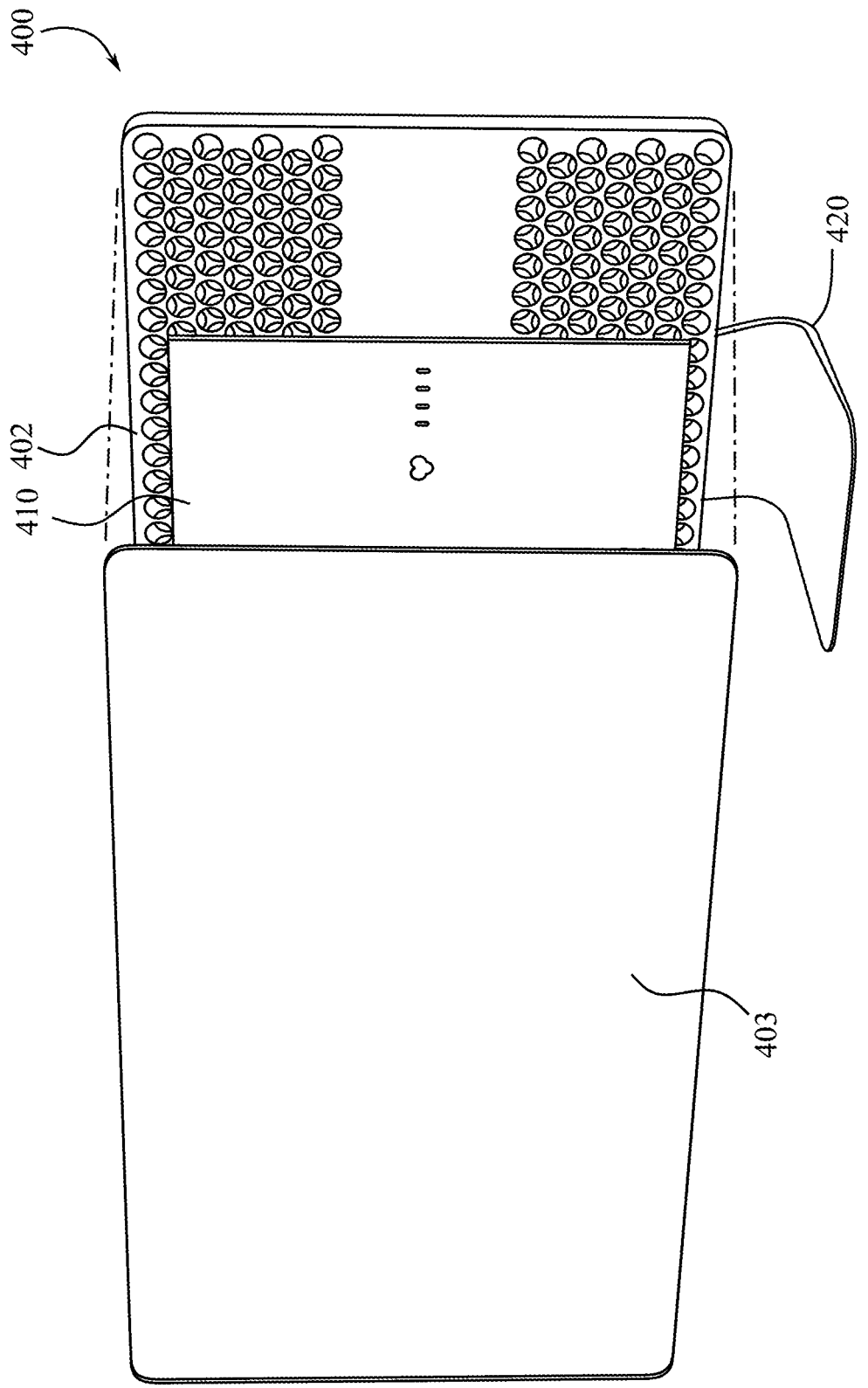
FIG. 5 shows an exploded view of the electronic device of FIG. 4.

Referring now to FIG. 5, the electronic device 400 can include a housing 102 and a cover 403 attached to the housing 402. A number of internal components, such as a display assembly 410, computing components, and other components can be disposed between the housing 402 and the cover 403. The housing 402 can substantially define at least a portion of an exterior surface of the device 400. The cover 403 can include glass, plastic, ceramic, or any other substantially transparent material, component, or assembly. The cover 403 can cover or otherwise overlay a display assembly 410, a camera, a touch sensitive surface such as a touchscreen, and other components, of the device 400. The cover 403 can define a front exterior surface of the device 400. Together the housing 402 and the cover 403 can substantially define the exterior surface of the device 400.

The device 400 can also include internal components, such as processors, memory, circuit boards, batteries, light emitting diodes (LEDs), fans, sensors, and other computing components. Such components can be disposed within an internal volume defined at least partially by the housing 402 and can be affixed to the housing 402 via internal surfaces, attachment features, threaded connectors, studs, posts, or the like, that are formed into, defined by, or otherwise part of the housing 402 and/or the cover 403.

The housing 402 can be formed according to the additive manufacturing processes described herein, and as such can include unique or complicated geometries. For example, the housing 402 can include regions having a three-dimensional structure in order to allow for enhanced cooling performance, noise reduction, and/or aesthetics. The three-dimensional structure, such as a three-dimensional structure formed in regions of the housing 402, can include a body having a first surface forming a portion of the exterior of the electronic device 400 and a second surface defining at least part of an internal volume of the housing 402. Additionally, other components of the electronic device 400, such as internal structural components, can be formed from or can include regions formed according to the processes described herein. In some examples, a housing 402 or other component can include a body with one or more cavities extending into the body from a first surface of a body and one or more cavities extending into the body from a second surface of the body. The one or more cavities extending into the body from the second surface of the body can intersect with or interfere with one or more cavities extending into the body from the first surface of the body to form a three-dimensional pattern of apertures or passageways in the body.

The body of a structure, for example, a contiguous structure formed according to the processes described herein, can include one or more structures formed in, defined by, or extending into the body from one or more of the surfaces of the body. For example, the body can have a generally cuboid shape, a generally spherical shape, a generally cylindrical shape, a generally toroidal shape, and the like. In some examples, the body can have a general shape of any polyhedron. In some other examples where the three-dimensional pattern extends through one or more regions of the body, the regions can be separated by one or more portions of the body that do not include the three-dimensional pattern. The one or more portions separating the regions of the body that include the three-dimensional pattern and can be substantially continuous. In some examples, however, the one or more portions can include structures or features formed in or on the one or more portions. As used herein, the term three-dimensional pattern can refer to a positive surface of a three-dimensional structure, or a negative space at least partially enclosed or defined by a surface or body. Further, the term enclosed is used herein to refer to a volume that is completely or entirely enclosed by a surface of body and does not comprise any pathways between the volume and an ambient environment external to the body. The three-dimensional pattern can include one or more irregular shapes, regular shapes, repeating shapes, or combinations thereof.

Figure 6:
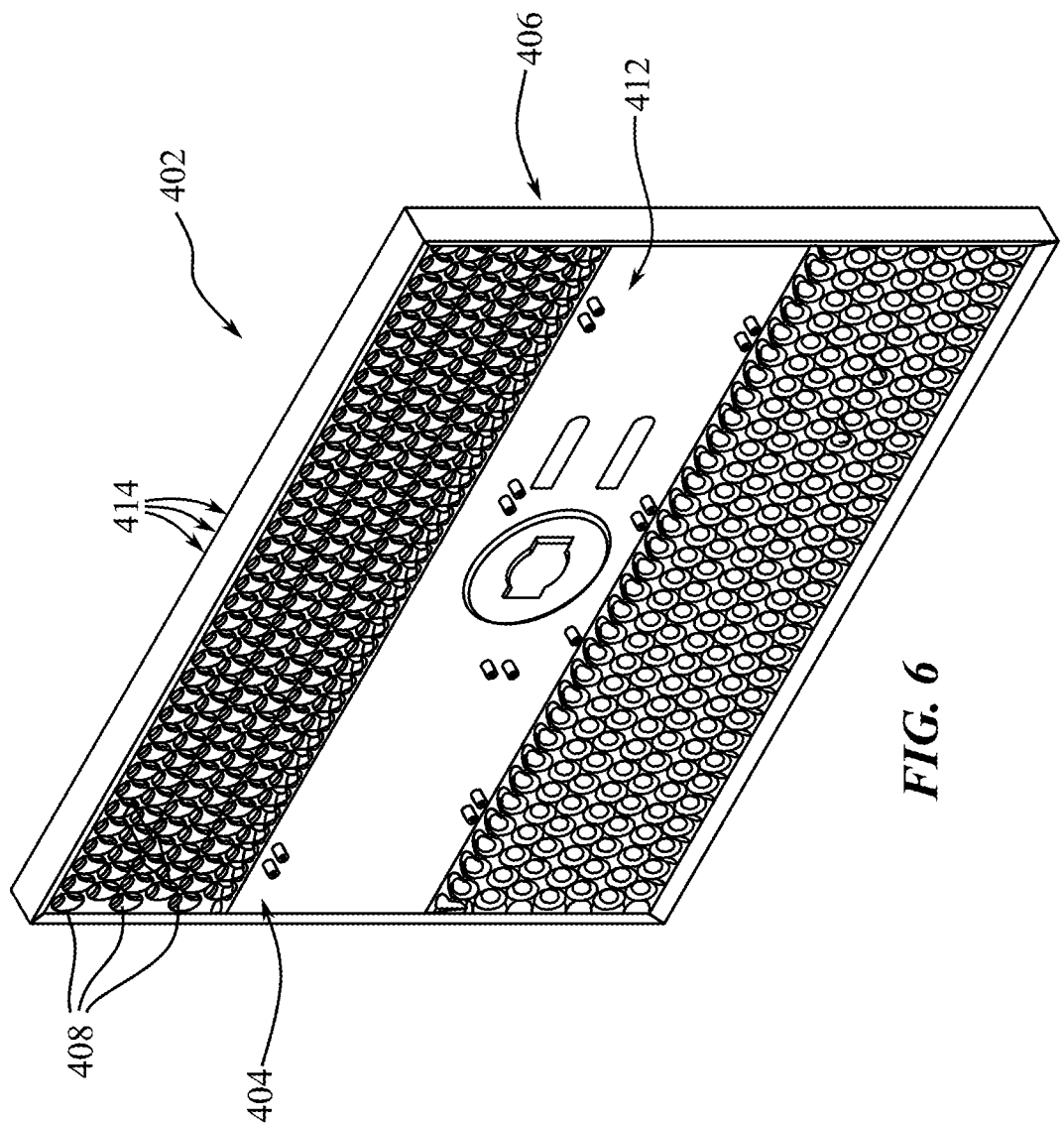
FIG. 6 shows a perspective view of a component of the electronic device of FIG. 4.

FIG. 6 illustrates a perspective view the housing 402 including a three-dimensional structure and formed according to the additive manufacturing processes described herein. The housing 402 can include a unitary body. The housing 402 can include at least a first surface 404 and a second surface 406. In some example, the first surface 404 and the second surface 406 can be opposing surfaces of the housing 402. For example, the first surface 404 can be parallel to and opposing the second surface 406. In some examples, however, the first surface 404 and second surface 406 may not be substantially parallel or opposed and can be adjacent to each other or disposed relative to one another at any angle.

One or more first cavities 408 or recesses can extend into the housing 402 from the first surface 404, while one or more second cavities 414 or recesses can extend into the housing 402 from the second surface 406. The first and/or second cavities 408, 414 can have substantially the same size and shape as one another, although in some example the first and/or second cavities 408, 414 can vary in size and shape from one another. The first and/or second cavities 408, 414 can have a substantially spherical or hemispherical shape, such that the negative space of a cavity 408, 414 can have a shape of a portion or region of a sphere. In some other examples, however, the first and/or second cavities 408, 414 can have any shape. As can be seen, the first and/or second cavities 408,414 can be arranged in a pattern, for example, a regular or repeating pattern of first and/or second cavities 408, 414. In some examples, the pattern can include a close-packed pattern of substantially spherical first and/or second cavities 408, 414, for example, a hexagonal close-packed pattern of substantially spherical cavities 408, 414. As used herein, a hexagonal close-packed pattern is intended to be understood as a structure that substantially corresponds to a layer of spheres or portions of spheres packed so that spheres or portions of spheres in alternating layers overlie one another, aligned in the gaps of the preceding layers. A traditional packing factor for hexagonal close packed systems is typically 0.74, though it can be higher in the present system due to the overlapping or interference pattern created. Further, as can be see, the regions of the housing 402 where the first and second cavities 408, 414 extend into the body can be separated by a portion 412 of the body that does not include the three-dimensional pattern.

Any number or variety of parts or components, for example, components of an electronic device, can be formed from according to the processes described herein and can include the structures as described herein. The structure and materials of the parts and components, as well as the components themselves, can apply not only to the specific examples discussed herein, but to any number or variety of examples in any combination. Various examples of components formed by the additive manufacturing processes described herein are described below with reference to FIGS. 7A-7D.

Figure 7A:
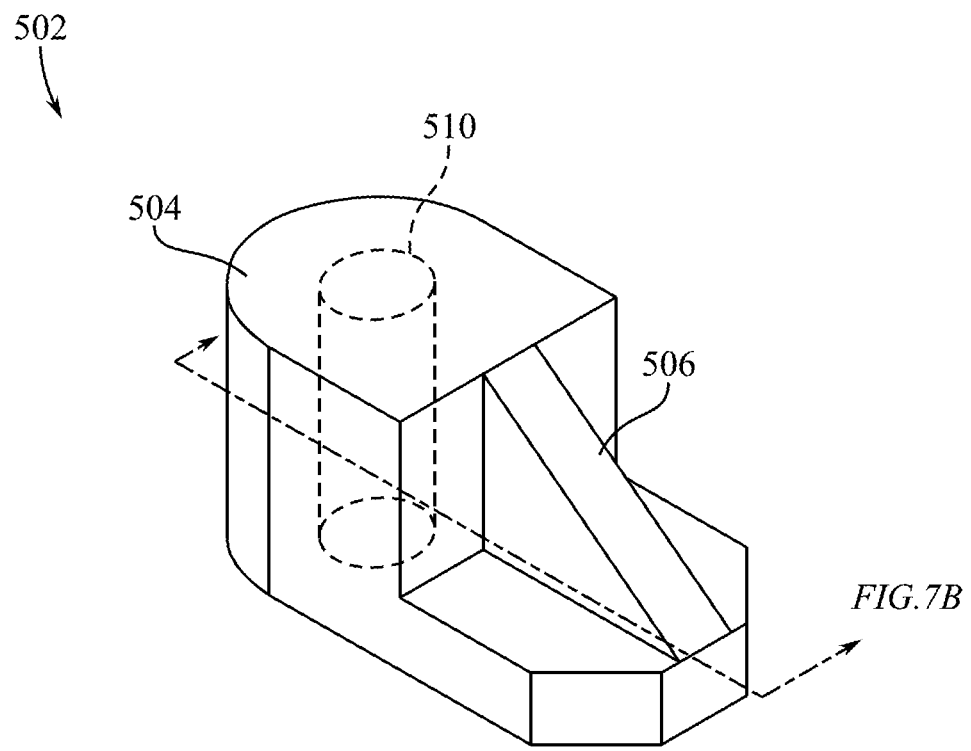
FIG. 7A shows a perspective view of a unitary body.

FIG. 7A shows a perspective view of a unitary body 502 including sintered metal and/or ceramic material and formed according to the additive manufacturing processes described herein. Although the body 502 is depicted as having a specific geometry, it will be understood that the unitary body 502 can have substantially any geometry desired. The body 502 can define an exterior surface 504 and can include one or more features 506 that can extend from the body 502. In some examples, the feature 506 can be formed concurrently with the body 502 according to the processes described herein. In some examples, however, the body 502 can be formed prior to the feature 506 and the feature can be formed and joined to the pre-formed body 502 according to the processes described herein.

The body 502 can also define a cavity 510 or volume having a substantially hollow box geometry. That is, the body 502 can define a cavity 510 that can be completely, or substantially completely enclosed by the body 502. The cavity 510 can be substantially uninterrupted by any features that provide support for those portions of the body 502 that define the cavity 510. In some examples, the cavity 510 can be at least partially defined by a roof or other portion of the body 502 that spans a distance and is unsupported by other portions of the body 502 except for those portions that define the cavity 510. In some examples, an angle of a sidewall defining the cavity 510 relative to the floor, roof, or other portion of the body 502 defining the cavity can be greater than about 15°, 20°, 30°, 40°, 45°, 50°, 60°, 70°, 80°, or greater than about 90° or more. In some examples, the cavity can define an enclosed volume of between about 1 cm$^3$ to about 10,000 cm$^3$, between about 10 cm$^3$ to about 5,000 cm$^3$, or between about 50 cm$^3$ and about 1000 cm$^3$.

Figure 7B:
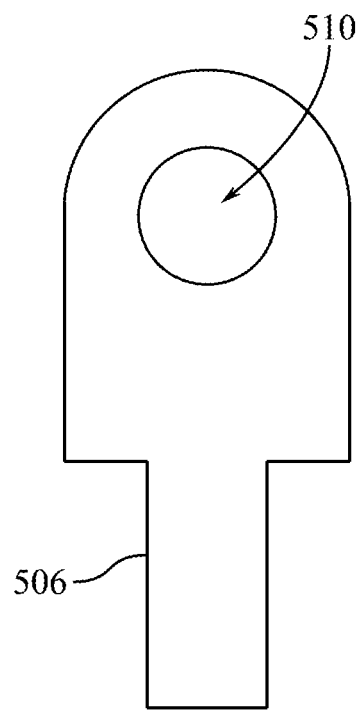
FIG. 7B shows a cross-sectional view of the unitary body of FIG. 7A.

FIG. 7B shows a cross-sectional view of the unitary body 502 of FIG. 7A. As can be seen, the cavity 510 can be completely or substantially enclosed by the body 502. The body 502 can be formed by sintering multiple portions or layers of a feedstock material having a desired geometry, as described herein. Accordingly, the cross-section shown in FIG. 7B can correspond to the shape of a single such layer or portion. In some examples, the cavity 510 can thus be defined by several portions or layers of the body 502, one or more of which can define an aperture or orifice. The alignment of several of these apertures or orifices defined by the layers of the body 502 can result in the formation of the cavity 510, as described herein.

Figure 7C:
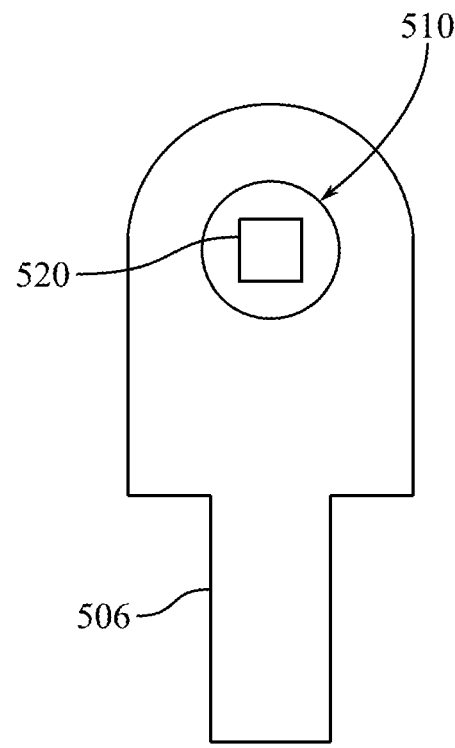
FIG. 7C shows a cross-sectional view of the unitary of FIG. 7A including a component.

While the cavity 510 can be substantially empty or hollow, that is, the cavity 510 may not include any material of the body 502, in some examples the cavity 510 can contain a component 520 disposed therein as shown in the cross-sectional view of FIG. 7C. In some examples, the component 520 can include a thermal component, mechanical component, and/or operational component. In some examples, the component 520 can include any type or combination of computing component, digital component, or mechanical component as desired. For example, the component 520 can include one or more sensors or an inductive charging component. In some examples, the body 502 can define an aperture or opening in communication with the cavity 510 to allow the insertion or positioning of the operational component 520 at a desired location. In some examples, however, the body 502 or portions thereof can be formed around the component 520 by the processes described herein. Thus, in some examples, the component 520 may not be directly connected to other operational components of an electronic device, but can instead include features to enable the component 520 to wirelessly receive data and/or power from a source or sources external to the cavity 510. Further details of other configurations of a unitary body formed according to the processes described herein are illustrated with respect to FIG. 7D.

Figure 7D:
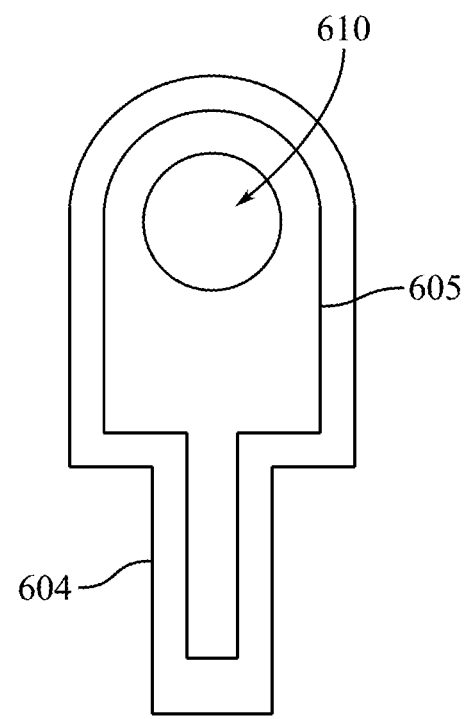
FIG. 7D shows a cross-sectional view of the unitary body of FIG. 7A.

FIG. 7D shows a cross-sectional view of the unitary body 602 that can be substantially similar to, and include some or all of the features of the unitary bodies described herein, such as the unitary body 502 of FIG. 7A. As with the body 502, the unitary body 602 including sintered metal and/or ceramic material can define a cavity 610. Further, in some examples, the body 602 can include multiple different materials, and/or materials having multiple different densities.

For example, the body 602 can include one or more exterior portions 604 that are fused or bonded to one or more interior portions 605. In some examples the exterior portion 604 can include a first material, while the interior portions 605 can include a second, different material, and/or the first material having a second, different density and/or grain structure.

In some examples, both the exterior portion 604 and the interior portion 605 can be formed as a unitary body 602 according to the processes described herein. In some examples, however, one or more of the exterior portion 605 and/or interior portion 604 can be pre-formed by another process and the other of the portions can be formed and fused to the pre-formed portion according to the processes described herein. For example, the interior portion 605 can be pre-formed and include any material as desired, while the exterior portion 604 can include a sintered metal and/or ceramic material that can be formed and fused to the interior portion 605 according to the processes described herein. The body 602 is not limited to having a two-part construction, however, and different portions including different materials can have any number, geometry, or arrangement as desired.

Any number or variety of parts or components, for example, components of an electronic device, can be formed from according to the processes described herein and can include the structures as described herein. The structure and materials of the parts and components, as well as the components themselves, can apply not only to the specific examples discussed herein, but to any number or variety of examples in any combination. Various examples of additive manufacturing processes described herein are described below with reference to FIGS. 8A-9E.

Figure 8A:
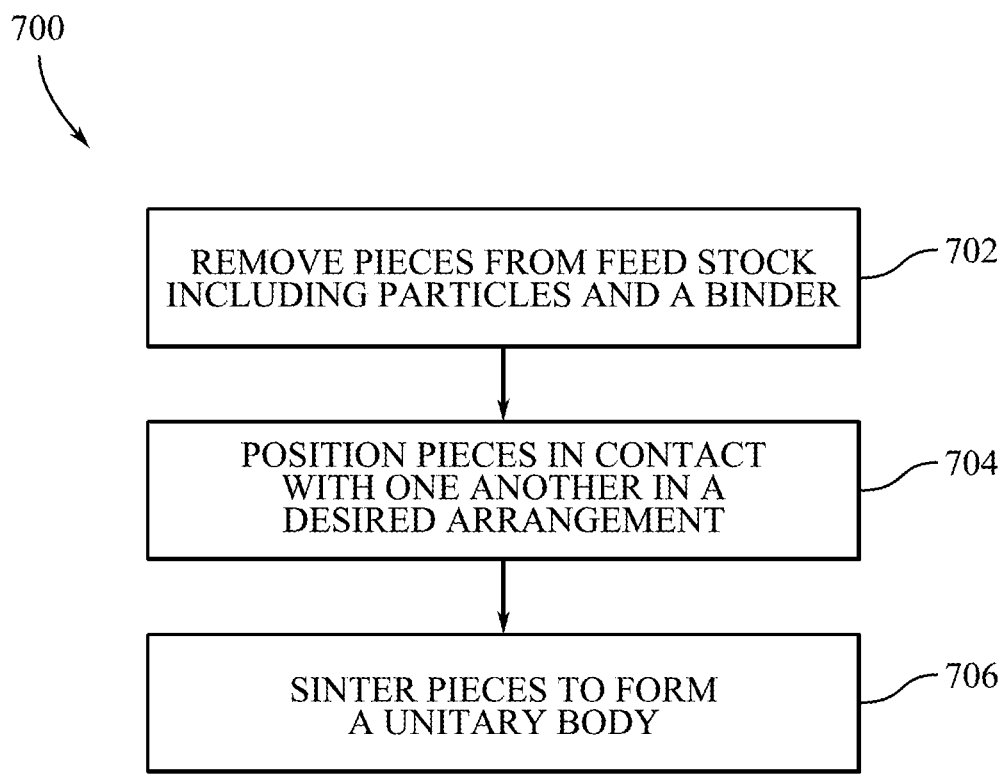
FIG. 8A shows a process flow diagram of a method of forming a unitary body.

FIG. 8A shows a process flow diagram of a method 700 of forming a unitary body that can be substantially similar to, and include some or all of the features of the unitary bodies described herein. At block 702, one or more portions or pieces can be removed from a feedstock including particles of a ceramic and/or metal material and a binder. At block 704, the pieces can be positioned in contact with one another in a desired arrangement or geometry. At block 706, the pieces can be sintered to remove substantially all of the binder therefrom, and to fuse or join the particles of the pieces into a unitary body including a sintered material or materials.

In some examples, the feedstock can include a polymer binder having a sinterable powder, or sinterable particles disposed or suspended therein. In some examples, the polymer binder can include one or more polymer materials.

In some examples, the sinterable particles can include any metallic and/or ceramic material as desired. In some examples, the sinterable particles can have an average major dimensions or diameter of between about 1 micron and about 200 microns, between about 5 microns and about 150 microns, between about 10 microns and about 100 microns, between about 20 microns and about 50 microns, or between about 20 microns and about 40 microns. In some examples, the particles can have a relatively uniform size distribution. That is, the particles can all have a substantially similar major dimension, for example, within about 5%, 10%, or 15% of the average major dimension of the particles. In some examples, however, the feedstock can include a variety of powder sizes, as desired. For example, the feedstock can include a first powder having a first average major dimension or range of major dimensions, and a second powder having a second, different average major dimension or range of major dimensions.

In some examples where the particles include a metal, the metal can include one or more of steel, aluminum, copper, titanium, and/or alloys thereof in any combination as desired. In some examples, where the particles include a ceramic, the ceramic can include sapphire, zirconia, or titania (titanium dioxide), in any combination as desired.

The feedstock can have substantially any shape as desired, and in some examples can include a sheet. Thus, in some examples, the one or more pieces can be removed from the feedstock sheet at block 702. In some examples, multiple feedstocks can be used, such that a first piece can be removed from a first feedstock and a second piece can be removed from a second, different feedstock, for example, including a different binder and/or different particles than the first feedstock. In some examples, removing the one or more pieces from the feedstock at block 702 can be accomplished by any technique as desired. In some examples, removing a piece from the feedstock can be accomplished by cutting the piece from the feedstock, for example, with a blade, tool, laser, water jet, or any other technique. In some examples, removing a piece from the feedstock at block 702 can include laser cutting one or more pieces from the feedstock. In some examples, removing a piece from the feedstock at block 702 can include stamping one or more pieces using a stamping tool having a desired shape.

In some examples, the pieces can be removed from the feedstock at block 702 in a desired shape and having a dimensional tolerance of less than about 1 millimeter (mm), less than about 750 microns, less than about 500 microns, less than about 250 microns, less than about 200 microns, less than about 100 microns, less than about 50 microns, less than about 25 microns, less than about 10 microns, or less than about 5 microns, or smaller.

The pieces can then be positioned relative to one another in a desired configuration or arrangement to form a green body, for example, corresponding to a desired shape or geometry of the final part, at block 704. In some examples, the pieces are positioned directly adjacent to or in direct contact with one another. In some examples, the pieces can be positioned in direct contact with other pieces or parts to which they will be fused or joined. For example, the one or more pieces removed from the feedstock can be positioned in contact with a pre-formed part to which they will be fused as described herein. In some examples, an adhesive or other material can be used to maintain the pieces in the desired configuration. In some examples, direct contact between the binder of the pieces can be sufficient to maintain the pieces in a desired arrangement as a green body. In some examples, pressure can be exerted on the pieces to reinforce or maintain the desired arrangement as a green body.

Once the pieces have been positioned relative to one another in the desired arrangement, the pieces can be sintered at block 706 to form a unitary body, such as the unitary bodies described herein. Sintering, at block 706, can include heating the pieces to one or more desired temperatures for one or more desired durations. In some examples, the sintering process of block 706 can include a debinding step. That is, the pieces can be heated to volatilize and remove some or all of the binder including each piece. In some examples, the debinding step can be separate from a sintering process. In some examples, however, debinding can occur during a sintering process at block 706.

In some examples, the sintering process can include heating the green body to a temperature of at least about 100° C., at least about 150° C., or at least about 200° C. or more for a desired duration. In some examples, the sintering process can include heating the green body to a temperature of at least about 300° C., at least about 350° C., at least about 400° C., at least about 450° C., at least about 500° C., or at least about 550° C. or more for a desired duration. In some examples, the sintering process can include heating the green body to a temperature of at least about 700° C., at least about 750° C., at least about 800° C., at least about 950° C., or at least about 1000° C. or more for a desired duration.

In some examples, the green body can be heated to a first temperature and held for a first duration, and then heated to one or more different temperatures and held for one or more durations as desired. Thus, in some examples, the sintering process of block 706 can include heating the green body to any combination of the temperatures described herein for any combination of durations. In some examples, heating the green body to a first temperature can remove a first portion of the binder, while heating the green body to a second, higher temperature can remove a second portion of the binder. In some examples, the first and second portions of the binder can include different polymers or components of the binder, such as components having different volatilization temperatures. In some examples, at least some of the binder can remain in the final sintered part even after the sintering process of block 706. In some examples, the final sintered part can have between about 0% and about 70% residual binder, by weight; or between about 0.001% and about 70% residual binder, by weight.

The sintering process of block 706 can result in the sintering or fusion of the metal and/or ceramic particles of the green body joining together or fusing with one another to form a unitary body as described herein. In some examples, the sintering process of block 706 can further density of consolidate the material of the particles and densify the unitary body to a desired degree. For example, a sintered unitary body as described herein can have a density of at least about 30%, at least about 40%, at least about 50%, at least about 60%, at least about 70%, at least about 80%, at least about 90%, at least about 95%, at least about 96%, at least about 97%, at least about 98%, at least about 99%, or at least about 99.5% or more. In some examples, the sintered unitary body can be substantially 100% dense. Further, as described herein, one or more portions of the unitary body can have different densities as desired.

As used herein, the term density can refer to the percentage of the volume of the sintered part that is occupied by the material of the particles or powder of the green body. That is, the percentage of the volume of the unitary body that is not occupied by pores and/or open spaces between sintered particles. Accordingly, the density of the unitary body can also be equal to 100% minus the porosity percentage of the unitary body. For example, a unitary body having a density of 99% will also have a porosity of 1%.

In some examples, one or more stages of the sintering process of block 706 can be carried out in one or more different atmospheres as desired. In some examples, sintering in different atmospheres can affect different metal and/or ceramic materials of the green body in different ways. For example, sintering in an atmosphere including oxygen can result in different materials, such as different metal alloys, achieving different colors in the sintered unitary body. In some examples, one or more stages of the sintering process can be carried out in an atmosphere including oxygen, nitrogen, hydrogen, an inert gas such as argon, any gas as desired, or combinations thereof. In some examples, one or more stages of the sintering process can be carried out at a reduced pressure, such as in a vacuum.

Figure 8B:
FIG. 8B shows a cross-sectional view of a unitary body.

FIG. 8B shows a cross-sectional view of a unitary body 710 including sintered metal and/or ceramic material and formed according to the additive manufacturing processes described herein. Specifically, FIG. 8B shows a unitary body 710 including a first layer 712 being a metal injection molding (MIM) layer. The MIM layer can include particles suspended in a binder. In some embodiments, a second layer 714 can also be a MIM layer. In other embodiments, the second layer 714 can include a layer of sheet metal or other material. In some examples, upon being joined together via sintering, as described above in reference to FIG. 8A, a MIM layer such as first layer 712 can act as a brazing layer. The MIM layer can fuse the layers of a sintered unitary body together. In some examples, the layers can form a cohesive material. FIG. 8B shows an example where a microstructure of the first layer 712 differs from a microstructure of the second layer 714. In some examples, the microstructures of the first layer 712 and the second layer 714 can include grain sizes that differ due to the different material history and/or composition of the layers, as well as possible impurities within the powder or binder of the MIM layer. For example, first layer 712 can include a MIM 316L layer and the second layer 714 can include an annealed 316Li sheet. After sintering, as described above, the first layer and the second layer can include differing grain structures, even though macroscopically and functionally the unitary body can be uniform. In some examples, the composition of the MIM layer can include a higher carbon content than a sheet metal. In some examples, differing MIM layers can include different material compositions.

Figure 8C:
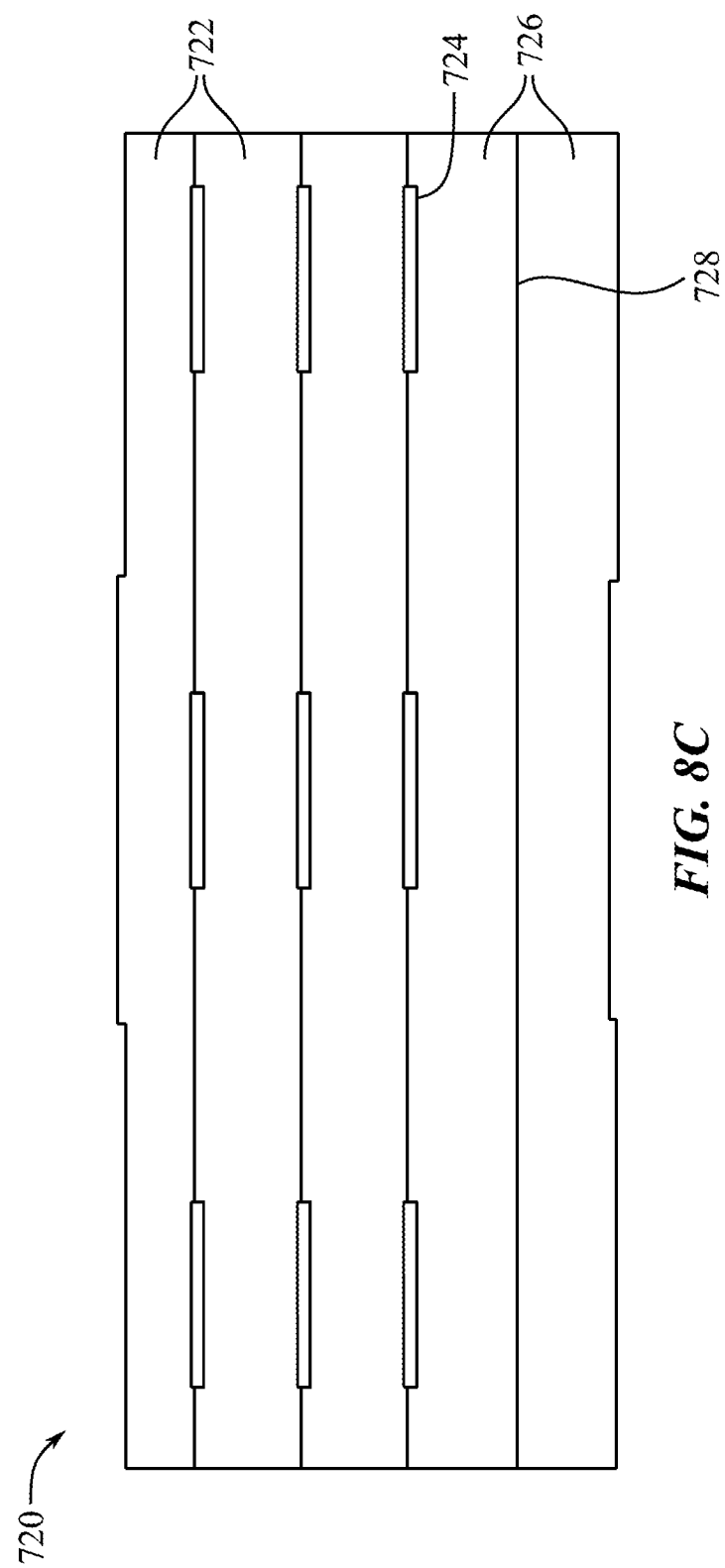
FIG. 8C shows a cross-sectional view of a unitary body.

FIG. 8C shows a cross-sectional view of a unitary body 720 including sintered metal and/or ceramic material formed according to the additive manufacturing processes described herein. In some examples, unitary body 720 can include multiple layers of material, for example layers 722. In an example, layers 722 can be MIM layers. In some examples, when layers 722 are MIM layers, the unitary body can include a slot 724. Slot 724 can include diameters of about 50 microns. In some examples, slot 724 can include ejection pinholes caused by manufacture processing. In some examples, layers 726 can include MIM layers. The MIM layers 726 can include an interface 728 between the layers that do not include slot 724. In some examples, layers 726 can be a material such as a sheet metal, sintered metal, and/or ceramic material that is not a MIM layer. After sintering, the layers 726 can be uniform and cohesive such that no distinguishing structure or slot is included at the interface 728.

Figure 8D:
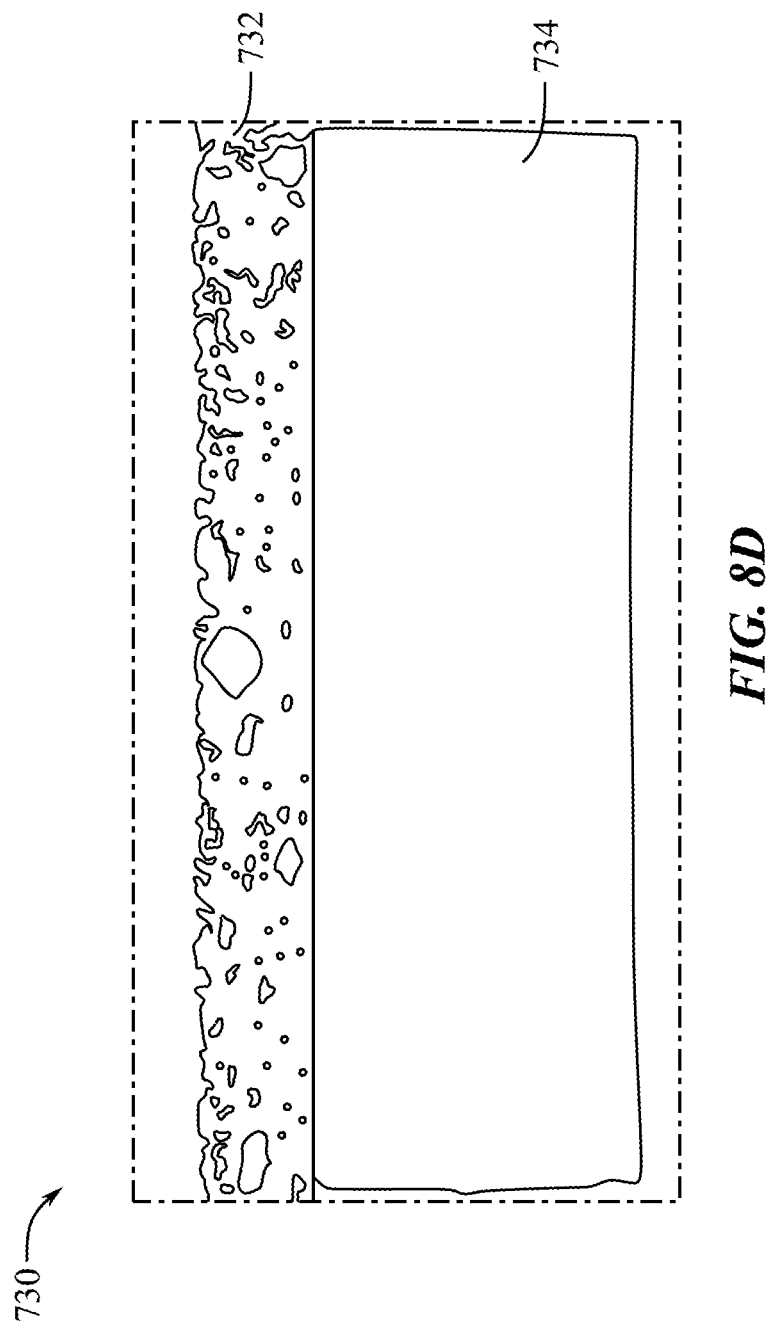
FIG. 8D shows a cross-sectional view of a unitary body.

FIG. 8D shows a cross-sectional view of a unitary body 730. In some examples, the unitary body 70 can have a first layer 732 interface with a second layer 734. The first layer 732 and the second layer 734 can include a first density and a second density, respectively. In some examples, the first density can be different from the second density. Similar to that described above with reference to FIG. 3D, an exterior layer or portion can include a material, such as a metal or ceramic material, having a first density, while an interior portion can include the same material having a second, different density. In some examples, the second layer 734 can have substantially any density described herein, such as a density of at least about 99%. In some examples, the first layer 732 can also have substantially any density described herein, such as a density of less than about 80%. In some examples, the first layer 732 can be considered a foam and/or a metallic foam. Further, in some examples, the density of any of the layers of the unitary body 730 can vary across one or more dimensions of the body. That is, any of the layers of the unitary body 730 can have a variable density at one or more regions, a stepped density between two or more regions, and/or a density gradient between two or more regions. In an example, the first layer 732 can include a porous MIM layer.

In some examples, the first layer 732 as a porous MIM layer can be sintered onto another material, such as the second layer 734. In some examples, the second layer 734 can include a MIM layer, a sheet metal, or other material. In some embodiments, the interface between the first layer 732 and the second layer 734 can be a gradient of densities and/or porosity. In other embodiments, the interface between the first layer 732 and the second layer 734 can be abrupt. For example, the density of the first layer 732 at the interface can be about 60% and the density of the second layer 734 at the interface can be about 99%. In some examples the porous MIM layer and/or unitary body 730 can include stainless steel structures, copper, titanium, aluminum, and/or other suitable metal.

In some examples, the density of the porous MIM layer can be controlled by the grain size of the powder prior to the sintering process. In other examples, the temperature of the sintering can be adjusted to control the density and/or porosity of the MIM layer and/or the unitary body 730. In some examples, the density of the porous MIM layer can be controlled to improve polymer/resin bonding in selective areas. In other examples, the density of the porous MIM layer can be controlled to reduce weight of the unitary body 730 in specific desired areas. According to one example, the density of a single porous MIM layer can be selectively tuned to have selectively dense areas (such as those areas likely to be impacted during a drop event, or areas that may be placed under a load during use) and selectively less dense in other areas of the MIM layer to reduce overall weight and/or to enhance polymer binding.

Figure 8E:
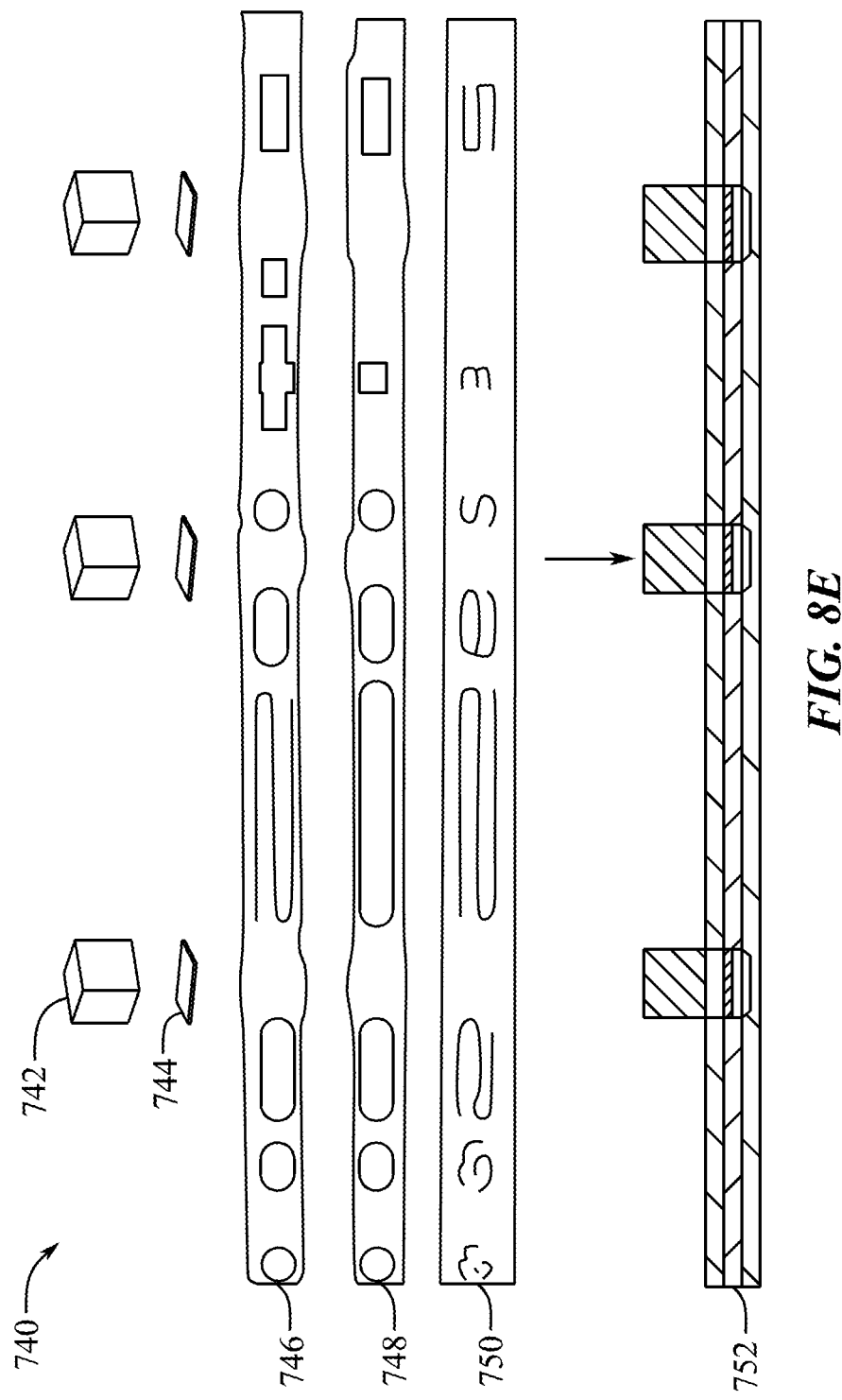
FIG. 8E shows an exploded view of a component of an electronic device.

FIG. 8E shows an exploded view of a component 740 of an electronic device. In some examples, the electronic device can include a boss column 742 and a boss column joint layer 744. The boss column 742 can be sintered to the boss column joint layer 744 and a core layer 746. The core layer 746 can be further sintered to a shell joint layer 748 and a cosmetic shell layer 750 in some examples. The core layer 746 and the cosmetic shell layer 750 can be a sheet metal. In some examples, the shell joint layer 748 can be a first material. In some examples, the first material can include a MIM layer or a material including particles suspended in a binder. In some examples, the first material can be positioned between and in contact with a second layer and a third layer, respectively. In FIG. 8E, the second layer can include the core layer 746 and the third layer can include the cosmetic shell layer 750. In some examples, the third layer can include a second material. The second material can include a sheet metal, a ceramic material, or another suitable material. In some examples, the third layer can be positioned in contact with the first layer such that the first layer is disposed between the second layer and the third layer. In such a configuration, in some examples, the first layer can act as an adherent layer between the second layer and the third layer prior to sintering. In other words, in manufacturing the component 740, the shell joint layer 748 can act as an adhesive between the core layer 746 and the cosmetic shell layer 750. The first layer, second layer, and third layer can be sintered together to form a unitary body. In an example, the boss column 742, the boss column joint layer 744, the core layer 746, the shell joint layer 748, and the cosmetic shell 750 can be sintered together to form the sintered assembly 752. In other words, the first layer, second layer, and third layer can be sintered together to form the unitary body and/or component 740 of the electronic device.

Further details of processes for forming a sintered unitary body as described herein are illustrated with respect to FIGS. 9A-9E.

Figure 9A:
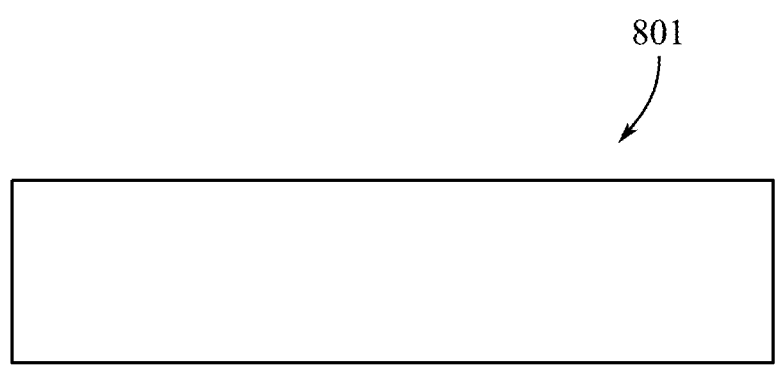
FIG. 9A shows a feedstock for use in a process of forming a unitary body.

FIG. 9A shows a feedstock 801 for use in a process of forming a unitary body, such as the process 700. In some examples, the feedstock 801 can be formed by mixing or combining a binder with a powder or particles including metal and/or ceramic material as described herein. In some examples, the feedstock 801 can be formed into substantially any shape as desired, such as a block, sheet, or shape having a curved geometry. In some examples, the material can be pressed into a desired shape to form the feedstock 801. In some examples, the material can be extruded into a desired shape to form the feedstock 801. In some examples, multiple different feedstocks 801 can be formed, such as feedstocks 801 having different materials, particles sizes, and/or binder loading percentages.

Figure 9B:
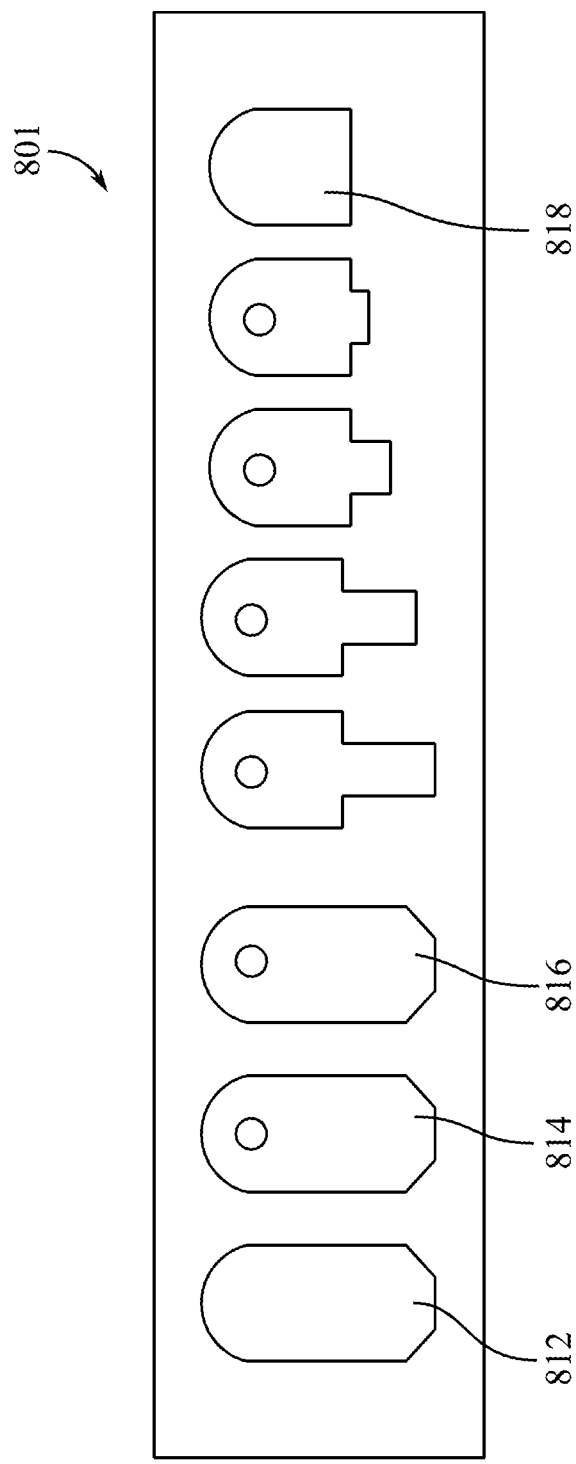
FIG. 9B shows the feedstock of FIG. 9A at a stage in a process of forming a unitary body.

FIG. 9B shows the feedstock 801 of FIG. 9A after having been pressed into a sheet shape. In some examples, this feedstock sheet 801 can have any thickness as desired. In some examples, the feedstock 801 can have a thickness of less than about 10 microns, less than about 5 microns, less than about 2 microns, less than about 1 micron, less than about 500 microns, less than about 250 microns, or less than about 200 microns or smaller. In some examples, the feedstock 801 can have a thickness of at least about 4 times, 5 times, 6 times, or 10 times, or more of the average major dimension of the particles including the feedstock.

As shown in FIG. 9B, multiple portions or pieces 812, 814, 816, 818 can be removed from a single portion of feedstock 801 as described herein. In some examples, however, one or more of the pieces 812, 814, 816, 818 can be removed from a different feedstock, such as a feedstock including different materials, particles sizes, and/or binder loading percentages.

Figure 9C:
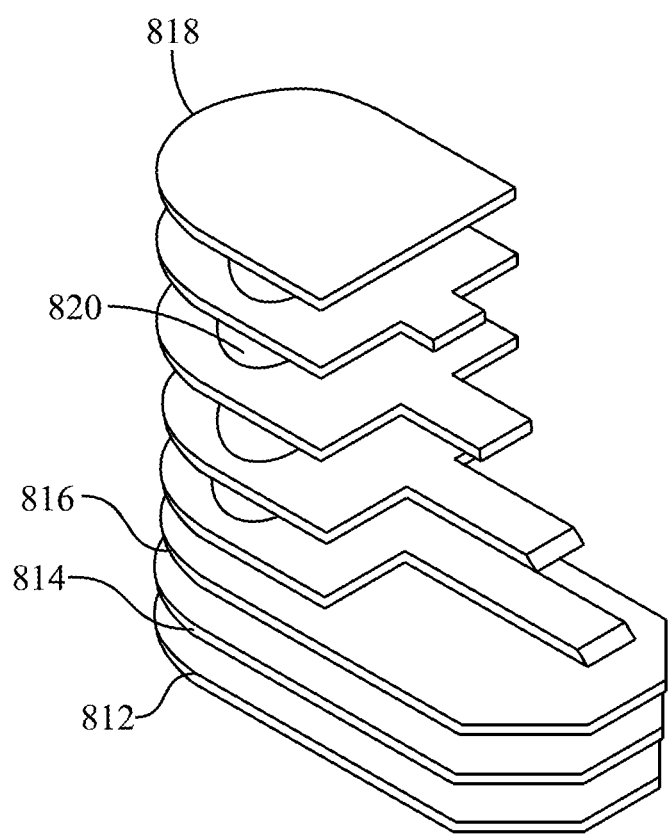
FIG. 9C shows a stage in the process of forming a unitary body.

FIG. 9C the pieces 812, 814, 816, 818 after having been removed from the feedstock 801. The pieces 812, 814, 816, 818 can be removed by any of the processes described herein, such as a laser cutting and/or stamping process. As can be seen, one or more of the pieces 812, 814, 816, 818 can define an aperture, orifice, notch, or other shape that when assembled into a desired configuration can define at least a portion of an unsupported span or cavity 820 as described herein.

The pieces 812, 814, 816, 818 can be positioned relative to one another as shown by any desired process or technique, for example, an automated or robotically controlled process. As described herein, one or more of the pieces 812, 814, 816, 818 can include different materials than one or more of the other pieces 812, 814, 816, 818. In some examples, the pieces 812, 814, 816, 818 can be a bottom piece 812, one or more middle pieces 814, 816, and a top piece 818. Further, in some examples, one or more of the pieces 812, 814, 816, 818 can include a pre-formed material, such as a portion of metal or ceramic that does not include the feedstock 801. For example, the bottom piece 812 and/or top piece 818 can include a sheet of a metallic material that can be fused to the particles of the other pieces 814, 816 during a sintering process as described herein.

Figure 9D:
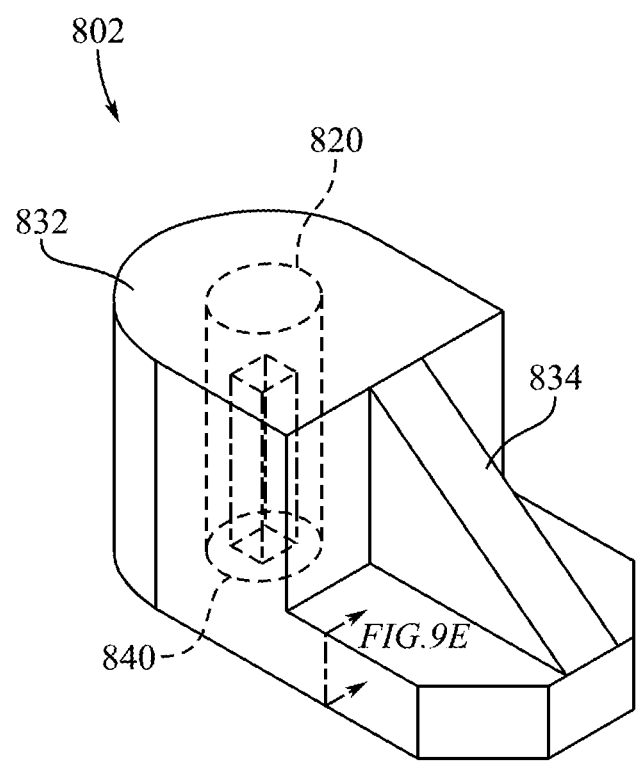
FIG. 9D shows a perspective view of a formed unitary body.

FIG. 9D shows a perspective view of a unitary body 802 formed from the assembled pieces 812, 814, 816, 818 of feedstock shown in FIG. 9C after being subjected to a sintering process as described herein. The body 802 can be substantially similar to, and include some or all of the features of the unitary bodies described herein. In some examples, the body 802 can define an exterior surface 832 and can include one or more features 834 that can extend from the body 802. The body 802 can also define a cavity 820 or volume having a substantially hollow box geometry. While the cavity 820 can be substantially empty or hollow, that is, the cavity 820 may not include any material of the body 802, in some examples the cavity 820 can contain a component 840 disposed therein.

In some examples, the body 802 can be smaller in one or more dimensions as compared to the green body formed from the pieces 812, 814, 816, 818. This can occur as a result of the sintering process. In some examples, the body 802 can shrink or be smaller in one or more dimensions by about 20 microns to about 30 microns as comparted to the dimensions of the green body.

Figure 9E:
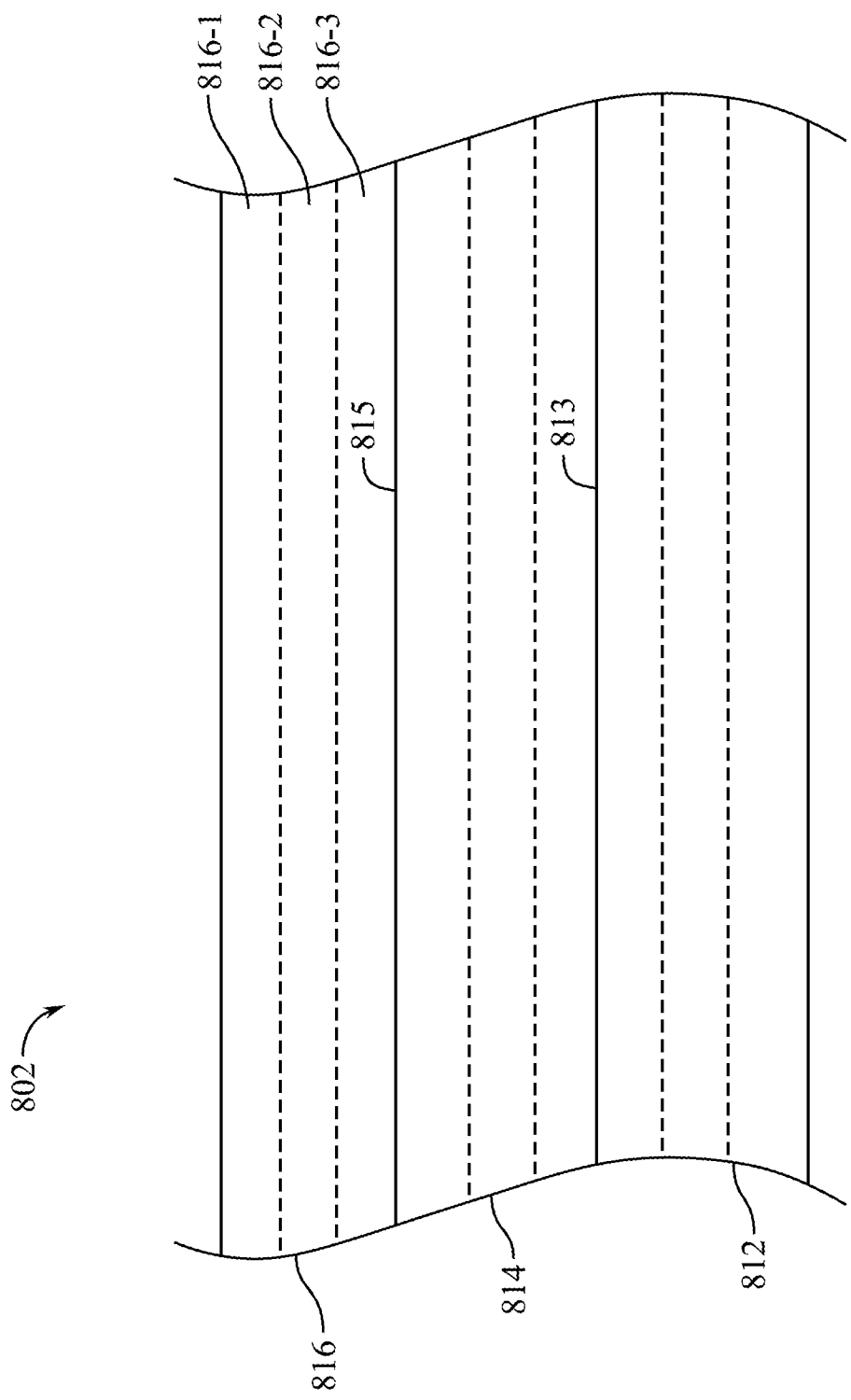
FIG. 9E shows a cross-sectional view of the microstructure of the unitary body of FIG. 9D.

FIG. 9E shows a cross-sectional view of the microstructure of the unitary body 802 of FIG. 9D. As can be seen, even though the unitary body 802 can be substantially dense and the layers or pieces forming the green body can be fused or joined together, in some examples, the interfaces between the pieces of the green body can still be visualized or distinguished in the formed body 802. For example, a piece 812 can be fused to the piece 814 along the interface 813 therebetween. Similarly, the pieces 814 can be fused to adjacent piece 816 along an interface 815. In some examples, these interfaces 813, 815 can be defined by differences in density, material, and/or grain structure between the adjacent layers even though the layers can be completely fused together, resulting in a striated microstructure.

In some examples, each layer or piece, such as piece 816 of the green body can result in a density and/or grain structure gradient in the unitary body 802 corresponding to the shape of the piece 816. For example, the piece 816 can result in relatively more dense regions 816-1 and 816-3 corresponding to the exterior regions, such as the top and bottom, of the piece 816. The piece 816 can also result in a relatively less dense region 816-2 corresponding to the interior region of the piece 816. In some examples, an absolute difference in density between the regions 816-1, 816-3 and the region 816-2 can be at least about 0.1%, 0.2%, 0.3%, 0.4%, 0.5%, 1%, 2%, or even at least about 5%.

Any of the features or aspects of the components, devices, and methods discussed herein can be combined or included in any varied combination. For example, any methods of forming a sintered unitary body for an electronic device can be used in combination to form any component as described herein. The steps, stages, or blocks of any of the methods described herein can be performed in any desired order and can be performed simultaneously if desired. Further, a component of a device can be formed from a sintered unitary body as described herein that can include one or more features formed therein. Any method can be used to form such a feature or features. Although certain methods and components are described with respect to housings, enclosures, or frames for electronic devices, the methods and components described herein can also be or form any number of additional components of an electronic device, including internal components, external components, cases, surfaces, or partial surfaces.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. A unitary body, comprising a sintered metal that defines an enclosed cavity of between about 1 cm$^3$ and about 10,000 cm$^3$, the unitary body including an exterior portion comprising a first material and an interior portion comprising a second material different from the first material, the exterior portion comprising an outer portion and an inner portion, the outer portion having a higher density than the inner portion.

2. The unitary body of claim 1, wherein the sintered metal comprises a first layer bonded to a second layer at an interface comprising a striated microstructure.

3. The unitary body of claim 1, further comprising between about 0.001% and about 70% binder by weight.

4. The unitary body of claim 1, wherein the sintered metal defines a sidewall and a floor, the sidewall and the floor at least partially defining the enclosed cavity, the sidewall having an angle relative to the floor of greater than about 20°.

5. The unitary body of claim 1, wherein the sintered metal comprises at least one of aluminum, steel, or titanium.

6. A method of forming a sintered metal unitary body, comprising:
   positioning a first layer comprising a first material in contact with a second layer comprising a second material different from the first material, the first layer comprising an exterior portion and the second layer comprising an interior portion of the unitary body, the first material comprising particles suspended in a binder; and
   sintering to form the unitary body, the unitary body defining an enclosed cavity of between about 1 cm³ and about 10,000 cm³, the first layer comprising an outer portion and an inner portion, the outer portion having a higher density than the inner portion.

7. The method of claim 6, further comprising positioning a third layer comprising the first material in contact with the second layer, the third layer defining an aperture.

8. The method of claim 6, further comprising:
   positioning a third layer comprising the second material in contact with the first layer such that the first layer is disposed between the second layer and the third layer;
   wherein the first layer comprises an adherent layer between the second layer and the third layer prior to sintering.

9. The method of claim 6, further comprising positioning a component in a volume defined by the unitary body.

10. The method of claim 6, wherein the first material comprises between about 0.001% and about 70% of the binder by weight.

11. The method of claim 6, further comprising removing the first layer from a feedstock by laser cutting.

12. The method of claim 6, wherein sintering the first layer and the second layer to form the unitary body comprises heating the first layer and the second layer to a temperature of at least 500° C.

13. The method of claim 6, further comprising debinding the first layer.

14. The unitary body of claim 1, wherein the
   exterior portion is fused to the interior portion along a planar interface region comprising a striated microstructure.

\* \* \* \* \*